(12) United States Patent
Dharmarajan et al.

(10) Patent No.: US 11,390,704 B2
(45) Date of Patent: *Jul. 19, 2022

(54) ETHYLENE COPOLYMER BLENDS FOR CROSS-LINKING APPLICATIONS

(71) Applicant: ExxonMobil Chemical Patents Inc., Baytown, TX (US)

(72) Inventors: Narayanaswami Dharmarajan, Houston, TX (US); Francis C. Rix, Houston, TX (US); Jo Ann M. Canich, Houston, TX (US); Danica L. Nguyen, Houston, TX (US); Peijun Jiang, Katy, TX (US); Rhutesh K. Shah, Katy, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 258 days.

This patent is subject to a terminal disclaimer.

(21) Appl. No.: 16/620,734

(22) PCT Filed: Jun. 14, 2017

(86) PCT No.: PCT/US2017/037503
§ 371 (c)(1),
(2) Date: Dec. 9, 2019

(87) PCT Pub. No.: WO2018/231224
PCT Pub. Date: Dec. 20, 2018

(65) Prior Publication Data
US 2020/0277427 A1     Sep. 3, 2020

(51) Int. Cl.
*C08F 236/20*     (2006.01)
*C08K 5/01*     (2006.01)

(52) U.S. Cl.
CPC ............ *C08F 236/20* (2013.01); *C08K 5/01* (2013.01); *C08F 2420/00* (2013.01)

(58) Field of Classification Search
CPC ....... C08F 236/20; C08F 2420/00; C08K 5/01
USPC ....................................... 524/554
See application file for complete search history.

(56) References Cited

U.S. PATENT DOCUMENTS

| | | | |
|---|---|---|---|
| 4,438,238 A * | 3/1984 | Fukushima | C08L 23/0815 525/247 |
| 6,506,857 B2 | 1/2003 | Rix et al. | |
| 6,875,816 B2 | 4/2005 | Degroot et al. | |
| 6,924,342 B2 | 8/2005 | Stevens et al. | |
| 7,999,039 B2 | 8/2011 | Degroot | |
| 8,318,998 B2 | 11/2012 | Crowther et al. | |
| 8,497,325 B2 * | 7/2013 | Tse | C08L 23/04 525/240 |
| 8,772,411 B2 * | 7/2014 | Lee | B32B 27/08 525/240 |
| 8,829,127 B2 | 9/2014 | Dharmarajan et al. | |
| 8,993,693 B2 * | 3/2015 | Lu | C08F 4/6055 526/90 |
| 9,657,122 B2 * | 5/2017 | Tse | C08F 210/16 |
| 10,808,049 B2 * | 10/2020 | Rix | C08F 210/06 |
| 10,822,440 B2 * | 11/2020 | Tsou | C10M 143/08 |
| 2003/0162926 A1 * | 8/2003 | Wouters | C08L 23/16 526/335 |
| 2012/0245311 A1 | 9/2012 | Crowther et al. | |
| 2014/0051809 A1 | 2/2014 | Tse | |
| 2015/0025209 A1 | 1/2015 | Canich et al. | |
| 2015/0322185 A1 | 11/2015 | Li Pi Shan | |

FOREIGN PATENT DOCUMENTS

| | | |
|---|---|---|
| JP | 08239416 A | 9/1996 |
| WO | 2015/009832 A1 | 1/2015 |
| WO | 2016/114914 A1 | 7/2016 |
| WO | 2016/114915 A1 | 7/2016 |
| WO | 2016/114916 A1 | 7/2016 |
| WO | 2018/013285 A1 | 1/2018 |
| WO | 2018/013286 A1 | 1/2018 |
| WO | 2018/013283 A1 | 2/2018 |
| WO | 2018/013284 A2 | 2/2018 |
| WO | 2018/026406 A1 | 2/2019 |

OTHER PUBLICATIONS

Yang et al., Macromolecules (2010) p. 8836, vol. 43.
Weng et al., Macromolecules (2002) p. 3838, vol. 35.
Wang et al., Polymer (2004) p. 5497, vol. 45.
Soares & McKenna, Polyolefin Reaction Engineering (2012) WILEY VCH.
Shan et al., Development of High Mooney Viscosity, Homogeneous Long-chain Branched EPDM, ACS Rubber Division Meeting (2013).
Walter et al., Polymer Bulletin (2001) p. 205, vol. 46.
Dekmezian et al., Macromolecules (2002) p. 9586, vol. 35.
J.M. Rose; G.W. Coates et al., Macromolecules (2008) p. 559, vol. 41.
Ohtaki et al., Macromolecules (2015) pp. 7489-7494, vol. 48.
Ravishankar, Rubber Chemistry and Technology (2012) pp. 327-349, vol. 85, No. 3.

* cited by examiner

*Primary Examiner* — Michael M. Bernshteyn

(57) ABSTRACT

Compositions are provided which include blends of (A) branched and/or bimodal ethylene copolymers and (B) linear ethylene copolymers. The branched and/or bimodal ethylene copolymers may be produced using a dual metallocene catalyst system comprising two different metallocene catalysts: one capable of producing high Mooney-viscosity polymers and one suitable for producing polymers having at least a portion of vinyl terminations. The linear ethylene copolymers may be produced using a metallocene catalyst capable of producing high Mooney-viscosity polymers, which may be the same as such catalyst of the dual metallocene catalyst system. Processes for making such blends, including parallel and/or series polymerization processes, are also provided. The blends may have excellent cure properties suitable in curable rubber compound applications.

25 Claims, 2 Drawing Sheets

ETHYLENE COPOLYMER BLENDS FOR CROSS-LINKING APPLICATIONS

CROSS-REFERENCE OF RELATED

This application is a National Phase Application claiming priority to PCT Application Serial No. PCT/US2017/037503 filed Jun. 14, 2017.

FIELD OF THE INVENTION

This invention relates to ethylene-based polymer compositions, and in particular to blends of (i) ethylene copolymer compositions with rheological characteristics of long-chain branching and (ii) relatively more linear ethylene copolymer compositions. The invention further relates to the use of such compositions, as well as methods for producing them.

BACKGROUND OF THE INVENTION

Long-chain branching is a desired trait among many ethylene copolymer compositions, particularly ethylene/α-olefin and optional diene rubbers (e.g., ethylene-propylene or EP rubbers and ethylene-propylene-diene or EPDM rubbers). The presence of long-chain branching may lead to improved processability and some improved end-use properties for certain copolymer and terpolymer rubbers such as EP and EPDM rubbers. For instance, long chain branching may result in polymers exhibiting improved melt elasticity, and/or improved shear thinning (indicating polymer that is highly viscous at low shear rates, but less viscous at higher shear rates associated with processing of polymers such as extrusion).

Although traditional Ziegler-Natta catalyzed rubbers may achieve such long-chain branching, they typically have a broader composition distribution (CD), such as a broader inter-chain distribution of ethylene-derived units, which may result in undesirably higher crystallinity. On the other hand, metallocene-based copolymers and terpolymers frequently exhibit desirably narrow CD. In addition, metallocene processes provide other advantages over Ziegler-Natta processes, such as lower energy costs, no need for gel filtration, and no need for de-ashing, making for substantially simpler and more economic production processes. However, such metallocene copolymers and terpolymers typically lack long chain branching, and have narrower molecular weight distribution (MWD), which may adversely affect the performance and processability of metallocene-based copolymer rubbers such as metallocene-based EP rubber (mEP) and metallocene-based EPDM rubber (mEPDM).

It is therefore a continued desire in the industry to discover metallocene polymerization catalysts and techniques that enable production of polymers with comparable or even superior rheological properties (e.g., shear-thinning, melt elasticity, lower loss angle, etc.) that are consistent with long-chain branched polymer architectures of some Ziegler-Natta polymers.

Along these and similar lines, some relevant publications include US Patent Publication No. US 2015/0025209 as well as those identified in Paragraphs [0005]-[0011] in US 2015/0025209 (incorporated by reference herein); WIPO Publication No. WO 2015/009832 as well as the publications identified in Paragraph [0004] of WO 2015/009832 (incorporated by reference herein); and also the following: WIPO Patent Publication Nos. WO 2016/114914, WO 2016/114915, and WO 2016/114916; US Patent Publication Nos. 2012/0245311, 2014/0051809; U.S. Pat. Nos. 6,506,857, 6,875,816, 6,924,342, 7,999,039, 8,318,998, 8,829,127; Japan unexamined patent publication Hei 8-239416; Soares & McKenna, *Polyolefin Reaction Engineering* (Wiley VCH 2012); Yang et al., *Macromolecules* vol. 43, p. 8836 (2010); Wang et al., *Polymer* vol. 45, p. 5497 (2004); Weng et al., *Macromolecules* vol. 35, p. 3838 (2002); and Shan et al., *Development of High Mooney Viscosity, Homogeneous Long-chain Branched EPDM*, Fall 2013 ACS Rubber Division Meeting; Dekmezian et al., *Macromolecules* vol. 33, p. 9586 (2002); Walter et al., *Polymer Bulletin* vol. 46, p. 205 (2001); Coates, *Macromolecules* vol. 41, p. 559 (2008).

SUMMARY OF THE INVENTION

The present inventors have found that particular blends of ethylene copolymer compositions, each preferably made by particular metallocene catalyst systems, provide an advantageous combination of properties associated with long-chain branching (e.g., superior melt elasticity) and fast cure times (e.g., for cross-linking applications).

Some embodiments therefore provide copolymer compositions, and in particular ethylene copolymer compositions, comprising a blend of (A) a branched and/or bimodal ethylene copolymer fraction and (B) a linear ethylene copolymer fraction. The branched and/or bimodal ethylene copolymer fraction (A) preferably exhibits rheology consistent with long-chain branching, and preferably also is bimodal (i.e., such that it may be considered both branched and bimodal), while the fraction (B) of such embodiments is more linear than the branched ethylene copolymer fraction (A). Further, the copolymer fraction (A) preferably has higher Mooney Viscosity than the linear ethylene copolymer fraction (B); also or instead, the fraction (A) it may be characterized as having higher weight-average molecular weight (Mw) and/or higher number-average molecular weight (Mn) than the linear ethylene copolymer fraction (B). Each fraction (A) and (B) is preferably composed of units derived from ethylene, one or more α-olefins (preferably $C_3$ to $C_{12}$ α-olefins such as propylene, 1-hexene, 1-octene, and the like), and, optionally, one or more polyenes (preferably one or more dienes, such as one or more non-conjugated dienes). Ethylene-propylene (EP) and/or ethylene-propylene-diene (EPDM) copolymers are particularly preferred.

In certain embodiments, the branched and/or bimodal copolymer fraction (A) and the linear copolymer fraction (B) may each be characterized by their Mooney Viscosity and/or Mooney Relaxation Area values. The fraction (A) may have Mooney Viscosity within the range from 15 to 40 MU (MST, 5+4@200° C.) and corrected Mooney Small-Thin Relaxation Area (cMSTRA) of at least 200 MU-sec, preferably at least 300 MU-sec, such as within the range from 200 to 600 MU-sec. The fraction (B) preferably has lower Mooney Viscosity and/or lower correct Mooney Relaxation Area than the fraction (A). For instance, the fraction (B) may have Mooney Viscosity (ML, 1+4 @ 125° C.) within the range from 20 to 100 MU, and corrected Mooney Relaxation Area (cMLRA) within the range from 15 to 100 MU-sec.

According to certain embodiments, the branched ethylene copolymer fraction (A) is produced by polymerizing ethylene, one or more α-olefins (preferably $C_3$ to $C_{12}$ α-olefins), and optionally one or more polyenes in the presence of a dual metallocene catalyst system. The dual metallocene catalyst system includes: (1) a first metallocene catalyst capable of producing high molecular-weight polymer chains, and in particular capable of incorporating vinyl-terminated hydrocarbon chains into the growing high molecular-weight polymer chain; and (2) a second metallocene catalyst capable of producing lower molecular-weight polymer chains, and which further generates a relatively high percentage of vinyl-terminated polymer chains. The first metallocene catalyst in some aspects is a bridged fluorenyl-cyclopentadienyl (Cp) group 4 complex, although other classes of metallocene catalyst (e.g., mono-Cp amido group 4 complexes, biphenyl phenol transition metal complexes, Cp-imido group 4 complexes, or pyridyl amide and/or diamide transition metal complexes) may be suitable. The second metallocene catalyst in some aspects is a bis-indenyl transition metal complex. The first and second metallocene catalysts are preferably activated by a first activator that is preferably a non-coordinating anion (NCA) activator. A preferred first activator according to some embodiments is N,N-dimethylanilinium tetrakis(heptafluoro-2-naphthyl)borate.

According to yet further embodiments, the linear ethylene copolymer fraction (B) is produced by polymerizing ethylene, one or more α-olefins (preferably $C_3$ to $C_{12}$ α-olefins), and optionally one or more polyenes in the presence of a catalyst system comprising only a high-Mooney-producing (i.e., high-molecular-weight-producing) metallocene catalyst. In preferred embodiments, the high-Mooney-producing metallocene catalyst is of the same structure as the first metallocene catalyst of the just-described dual metallocene catalyst system. This metallocene catalyst may also be activated by a second activator, which is preferably also a NCA activator. In certain embodiments, the second activator comprises N,N-dimethylanilinium tetrakis(pentafluorophenyl)borate.

Yet further aspects provide for polymerization processes that include (1) polymerizing ethylene, one or more α-olefins, and optionally one or more polyenes in the presence of a dual metallocene catalyst system such as those described above; and (2) polymerizing ethylene, one or more α-olefins, and optionally one or more polyenes in the presence of a catalyst system comprising only a high-Mooney-producing metallocene catalyst, such as those just described.

The use of metallocene catalysts according to various embodiments provides polymers of different topology as compared to, e.g., polymers produced by Ziegler-Natta catalysis. For instance, the polymers of such embodiments may exhibit "T" or comb-type branching, i.e., the main polymer chain may contain predominantly three-way branch points with primarily linear side chains. On the other hand, Ziegler-Natta catalysis would lead to hyper-branching, where branching is random and side-chains may themselves be highly branched.

The blends of various embodiments are formed by (and/or the processes for making such blends include) any suitable means of blending. For instance, two parallel polymerization reactions may be used to produce the branched ethylene copolymer fraction (A) and the linear ethylene copolymer fraction (B), followed by blending of the two polymerization effluents while still in solution, followed in turn by standard separations processes (e.g., devolatilization and the like) to recover the solid polymer product from solution. In other embodiments, solid polymer corresponding to the branched ethylene copolymer fraction (A) and the linear ethylene copolymer fraction (B) may be melt-mixed, co-extruded, or otherwise physically blended in a post-polymerization process.

In alternative embodiments, the blend may be a series reactor blend. For instance, a first series polymerization reaction zone comprising a high-Mooney-producing catalyst may be used to polymerize ethylene, α-olefin, and optionally polyene monomers to produce a first polymerization effluent comprising the linear ethylene copolymer fraction (B). That first effluent is then fed to a second polymerization reaction zone (optionally with additional ethylene, α-olefin, and optional polyene monomer), and polymerized in the presence of a dual metallocene catalyst system to produce the blend comprising the branched copolymer fraction (A) and the linear copolymer fraction (B). Other dispositions of catalysts in series reactions are also contemplated in some embodiments, including: (i) vinyl-termination-producing catalyst in a first series polymerization reaction zone, followed by a dual catalyst system in the second series polymerization reaction zone; (ii) dual catalyst system in the first series reaction zone, followed by either a vinyl-termination-producing catalyst or a high-Mooney-producing catalyst in the second series reaction zone; (iii) vinyl-termination-producing catalyst in the first series reaction zone, followed by high-Mooney-producing catalyst in the second reaction zone; or (iv) high-Mooney-producing catalyst in the first reaction zone, followed by vinyl-termination-producing catalyst in the second series reaction zone.

The blends according to various of the above aspects (and/or those produced according to various of the above aspects) may be particularly well-suited for cross-linking applications, for instance in rubber formulations. Therefore, the present invention in some embodiments also includes crosslinked compositions and crosslinkable formulations comprising such ethylene copolymer compositions.

DETAILED DESCRIPTION

Figure 1:
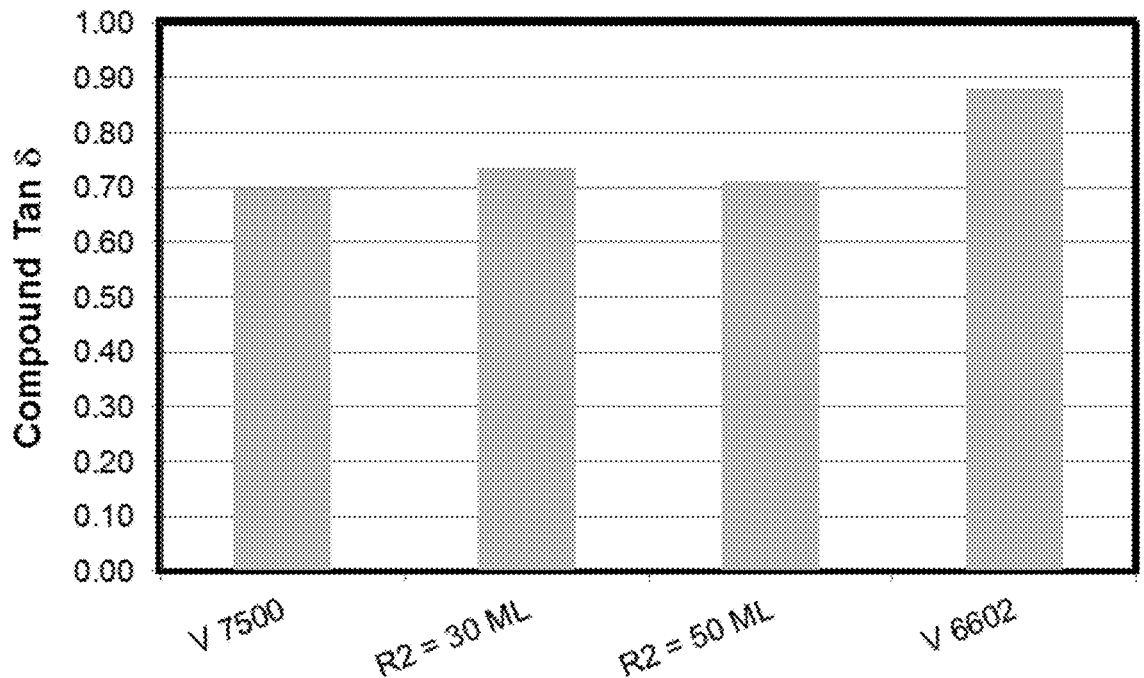
FIG. 1 is a graph showing tan(δ) values of various compounds in accordance with Example 4.

The present inventors have developed certain blends of ethylene copolymers that provide a particularly useful balance of desired properties, making the copolymers excellent for processing and for use in curing, or cross-linking, applications. For instance, the inventive blends, and formulations including the inventive blends, are able to be processed as easily as conventional Ziegler-Natta ethylene copolymers, while at the same time the blend copolymers are advantageously produced by single-site polymerization catalysts, preferably metallocene catalysts. This provides an efficient and economical process for the blends' production, particularly as compared to conventional Ziegler-Natta polymerization processes.

In particular, the inventors have found a good balance of properties for cross-linking applications when blending (A) a branched ethylene copolymer composition with (B) a substantially linear ethylene copolymer composition. The branched ethylene copolymer composition alone exhibits rheology consistent with long-chain branching; however, the inventors have found that this component, used on its own, tends to suffer from decreased cure rates. Without wishing to be bound by theory, the inventors believe this may be due to low-molecular-weight fractions among the branched ethylene copolymer composition.

Blending the branched composition (A) with a substantially more linear copolymer composition (B) helps provide better properties for curing applications, while the blend retains much of the advantages of the branched (preferably long-chain branched and bimodal) blend fraction (A). The end result is a copolymer composition that is relatively economical to produce as compared to traditional Ziegler-Natta copolymers, while still having excellent processability and cross-linking properties.

Definitions

As used herein, the numbering scheme for the Periodic Table Groups is the notation as set out in CHEMICAL AND ENGINEERING NEWS, 63(5), 27 (1985). Therefore, a "group 4 metal" is an element from group 4 of the Periodic Table, e.g., Zr, Ti, and Hf.

References are made herein to metallocene catalysts. The ordinarily skilled artisan will recognize that a metallocene catalyst composition is typically activated prior to its use in polymerization, so as to put the metallocene catalyst into its ionic form that reacts with the monomers to produce polymers. Such an activated catalyst may be referred to as an "activated catalyst" or the catalyst may otherwise be referred to as "activated." However, the ordinarily skilled artisan will readily be able to determine the state of the metallocene catalyst (i.e., activated or still in un-activated, or precursor, form) from the context of the discussion; therefore, a metallocene catalyst is not always necessarily referred to as "activated" or "pre-activated," but instead may simply be referenced as a metallocene catalyst, or simply as a "catalyst." For instance, a catalyst fed to and/or disposed in a polymerization reaction zone to effect polymerization can readily be assumed to be in the activated form (with or without a charge balancing moiety resulting from activation) unless specifically noted otherwise; on the other hand, a metallocene catalyst composition described as being contacted with an activator or a catalyst activator can readily be assumed to be in the un-activated or precursor form (i.e., having anionic ligands bonded to the transition metal). Likewise, although catalyst composition structures may be described herein in their un-activated form, it will be readily apparent that the active form is also intended to be included in such description; and vice-versa. The activated form will be readily apparent to the skilled artisan upon review of the un-activated or precursor form, and vice-versa.

A "dual catalyst system" or "dual metallocene catalyst system," as used herein, references a reaction or other process utilizing two different catalysts, or two different metallocene catalysts, respectively. Likewise, a "dual catalyst polymerization" or "dual catalyst metallocene polymerization" references a process in which polymerization of one or more types of monomers takes place in the presence of two different catalysts, e.g., two different metallocene catalysts.

A "polymerization reaction zone" includes any space in which the polymerization of monomers may take place. Particular examples include a polymerization reactor or a set of multiple polymerization reactors connected in series or operating in parallel, which may be in accordance with any known polymerization reactor (e.g., a continuous stirred tank reactor, a solution reactor, fluidized bed, or the like). In preferred embodiments, a polymerization reaction zone comprises a single polymerization reactor.

A scavenger is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound. A transition metal compound may be neutral as in a precatalyst, or a charged species with a counter ion as in an activated catalyst system.

As used herein, Mn is number average molecular weight, Mw is weight average molecular weight, and Mz is z average molecular weight, wt % is weight percent, and mol % is mole percent. Molecular weight distribution (MWD), also referred to as polydispersity, is defined to be Mw divided by Mn (Mw/Mn). Unless otherwise noted, all molecular weight units (e.g., Mw, Mn, Mz) are g/mol. An "alkyl" group is a linear, branched, or cyclic radical of carbon and hydrogen. In a preferred embodiment, "alkyl" refers to linear alkyls.

As used herein, a "copolymer" refers to any polymeric compound formed from, and/or containing units derived from, two or more monomeric units. Copolymers include "terpolymers," which are a more specific case of polymeric compound formed from and/or containing units derived from three monomeric units.

Reference may be made to a polymer comprising a monomer, e.g., ethylene; or alternatively as "comprising ethylene-derived units", "comprising diene-derived units", or "units derived from ethylene" (or another monomer), and the like. It should be understood that all such references equivalently mean that the polymer contains ethylene (and/or such other identified monomer(s)) in the polymerized form of such monomer.

A polymer composition or fraction being labeled as "bimodal" means that two or more peaks of different molecular weight are readily discernable in a plot of (x) molecular weight as a function of (y) relative proportions of the polymer exhibiting a given molecular weight, such as that obtained by gel permeation chromatography (GPC) analysis of a polymer composition.

"Mooney viscosity" as used herein is the Mooney viscosity of a polymer or polymer composition. The polymer composition analyzed for determining Mooney viscosity should be substantially devoid of solvent. For instance, the sample may be placed on a boiling-water steam table in a hood to evaporate a large fraction of the solvent and unreacted monomers, and then, dried in a vacuum oven overnight (12 hours, 90° C.) prior to testing, in accordance with laboratory analysis techniques, or the sample for testing may be taken from a devolatilized polymer (i.e., the polymer post-devolatilization in industrial-scale processes). Unless otherwise indicated, Mooney viscosity is measured using a Mooney viscometer according to ASTM D-1646, but with the following modifications/clarifications of that procedure. First, sample polymer is pressed between two hot plates of a compression press prior to testing. The plate temperature is 150° C.+/−10° C. instead of the 50+/−5° C. recommended in ASTM D-1646, because 50° C. is unable to cause sufficient massing. Further, although ASTM D-1646 allows for several options for die protection, should any two options provide conflicting results, PET 36 micron should be used as the die protection. Further, ASTM D-1646 does not indicate a sample weight in Section 8; thus, to the extent results may vary based upon sample weight, Mooney viscosity determined using a sample weight of 21.5+/−2.7 g in the ASTM D-1646 Section 8 procedures will govern. Finally, the rest procedures before testing set forth in D1646 Section 8 are 23+/−3° C. for 30 min in air; Mooney values as reported herein were determined after resting at 24+/−3° C. for 30 min in air. Samples are placed on either side of a rotor according to the ASTM D-1646 test method; torque required to turn the viscometer motor at 2 rpm is measured by a transducer for determining the Mooney viscosity. The results are reported as Mooney Units (ML, 1+4 @ 125° C.), where M is the Mooney viscosity number, L denotes large rotor (defined as ML in ASTM D1646-99), 1 is the pre-heat time in minutes, 4 is the sample run time in minutes after the motor starts, and 125° C. is the test temperature. Thus, a Mooney viscosity of 90 determined by the aforementioned method would be reported as a Mooney viscosity of 90 MU (ML, 1+4 @ 125° C.). Alternatively, the Mooney viscosity may be reported as 90 MU; in such instance, it should be assumed that the just-described method is used to determine such viscosity, unless otherwise noted. In some instances, a lower test temperature may be used (e.g., 100° C.), in which case Mooney is reported as Mooney Viscosity (ML, 1+4 @ 100° C.), or @ TOC where T is the test temperature.

The torque limit of the Mooney viscometer is about 100 Mooney units (MU). Mooney values greater than about 100 Mooney units generally cannot be measured under these conditions. In this event, a non-standard rotor design is employed with a change in Mooney scale that allows the same instrumentation on the Mooney viscometer to be used for more viscous polymers. This rotor is both smaller in diameter and thinner than the standard ML rotor, and thus it is termed MST (Mooney Small-Thin). MST methods may be used to determine viscosity of polymers having viscosity greater than 100 Mooney units as described in Col. 5, lines 15-52 of U.S. Pat. No. 9,006,332, which description is incorporated herein by reference. In particular, MST may be determined and reported as (MST, 5+4 @ 200° C.), meaning a 5 minute pre-heat and 4-minute torque recording at 200° C. is used with the MST rotor. Further, if Mooney viscosity is reported herein as MU, MST, then it should be assumed unless otherwise noted that the just-described method for determining MST viscosity is used. Nonetheless, in accordance with some embodiments, a conversion factor to put MST measurements in terms of ML values (or vice-versa) may be used: (MST, 5+4 @ 200° C.)=5.0*(ML, 1+4 @ 125° C.).

The MST rotor should be prepared as follows:
1. The rotor should have a diameter of 30.48+/−0.03 mm and a thickness of 2.8+/−0.03 mm (tops of serrations) and a shaft of 11 mm or less in diameter.
2. The rotor should have a serrated face and edge, with square grooves of 0.8 mm width and depth of 0.25-0.38 mm cut on 1.6 mm centers. The serrations will consist of two sets of grooves at right angles to each other (form a square crosshatch).
3. The rotor shall be positioned in the center of the die cavity such that the centerline of the rotor disk coincides with the centerline of the die cavity to within a tolerance of +/−0.25 mm. A spacer or a shim may be used to raise the shaft to the midpoint.

The wear point (cone shaped protuberance located at the center of the top face of the rotor) shall be machined off flat with the face of the rotor.

"Mooney Relaxation Area" is essentially a stored energy term indicative of the presence of long-chain branching (such that higher Mooney Relaxation Area values indicate greater degree of branching). It is obtained from the Mooney viscosity measurement (ML and MST, respectively, as applicable) when the rubber relaxes after the rotor is stopped, such that Mooney Relaxation Area is reported as MLRA or MSTRA (based upon whether the underlying Mooney Viscosity measurement is ML or MST), and accordingly may also be referred to as "Mooney Large Relaxation Area" or "Mooney Small-Thin Relaxation Area," as applicable. Each of the MLRA and the MSTRA is the integrated area under the Mooney torque-relaxation time curve from 1 to 100 seconds. MLRA and MSTRA are each a measure of chain relaxation in molten polymer and can each be regarded as a stored energy term which suggests that, after the removal of an applied strain, the longer or branched polymer chains can store more energy and require longer time to relax. Therefore, the MLRA or MSTRA value of a bimodal rubber (the presence of a discrete polymeric fraction with very high molecular weight and distinct composition) and/or a long chain branched rubber are larger than a broad or a narrow molecular weight rubber when compared at the same Mooney viscosity values (ML or MST, respectively).

Mooney Relaxation Area (MLRA or MSTRA) is dependent on the Mooney viscosity of the polymer, and increases with increasing Mooney viscosity. In order to remove the dependence on polymer Mooney Viscosity in the case of ML-based Mooney viscosities, a corrected MLRA (cMLRA) parameter may be used, where the MLRA of the polymer is normalized to a reference of 80 Mooney viscosity (ML, 1+4 @ 125° C.), meaning it is the MLRA value expected for the polymer at 80 MU (ML, 1+4 @ 125° C.). The formula for cMLRA is provided below:

$$cMLRA = MLRA\left(\frac{80}{ML}\right)^{1.44},$$

where MLRA and ML are the Mooney Relaxation Area and Mooney viscosity of the polymer sample measured at 125° C. Similarly, a cMSTRA can be used, derived from a similar correlative equation, with MST in place of ML, and adjustment of the correlative numbers (such that it is normalized to a reference of 50 Mooney viscosity (MST, 5+4 @ 200° C.)):

$$cMSTRA = MSTRA\left(\frac{50}{MST}\right)^{1.44}.$$

Alternatively, the ratio MLRA/ML may be used to encompass both the MLRA and ML data, in view of MLRA's dependence upon ML (although it should be noted this does not remove the dependency of MLRA on ML; it simply ensures that both terms are encompassed). Such measurement may be particularly useful where comparing polymers with Mooney viscosities within 10% of one another. Similarly, the ratio MSTRA/MST may be used to encompass both the MSTRA and MST data, in view of MSTRA's dependence upon MST, particularly when comparing polymers with Mooney viscosities within 10% of one another. Each ratio has the dimension of time. A higher MLRA/ML (or MSTRA/MST) number signifies a higher degree of melt elasticity for materials with similar value of ML or MST, as applicable. Long chain branching will slow down the relaxation of the polymer chain, hence increasing the value of MLRA/ML or MSTRA/MST.

Ethylene Copolymer Blends

The blends according to some embodiments comprise (A) a branched ethylene copolymer fraction and (B) a linear ethylene copolymer fraction. Although the fraction (B) is referred to herein as "linear," this does not necessarily mean the fraction (B) is completely devoid of branching. Instead, this nomenclature is used because the fraction (B) is substantially more linear than the fraction (A), as indicated by the rheological behavior of the two fractions.

Each fraction (A) and (B) is preferably composed of units derived from ethylene, one or more α-olefin comonomers, and optionally one or more polyenes (preferably non-conjugated dienes). Each of the one or more α-olefin comonomers other than ethylene in each fraction is independently selected from $C_3$-$C_{40}$ α-olefins, preferably $C_3$ to $C_{20}$ α-olefins, more preferably $C_3$ to $C_{12}$ α-olefins (e.g., propylene, butene, pentene, hexene, heptene, octene, nonene, decene, undecene, dodecene and isomers thereof). Propylene is a particularly preferred α-olefin comonomer. Suitable non-conjugated polyenes include any polyene described in Paragraph [220] of US Patent Publication No. 2015/0025209 (which description is incorporated herein by reference), with non-conjugated dienes preferred, and 5-ethylidene-2-norbornene (ENB) particularly preferred. Thus, in certain embodiments, the polyene comprises, or consists of, ENB.

Each fraction preferably comprises an EP (ethylene-propylene) copolymer (i.e., a copolymer comprising units derived from ethylene and units derived from propylene), such as an EPDM (ethylene-propylene-diene) terpolymers (i.e., a terpolymer composed of units derived from ethylene, one or more α-olefins such as propylene, and one or more polyenes, preferably one or more dienes). It should be noted that although the term "EPDM" may be used as shorthand in many instances herein, the ordinarily skilled artisan will recognize that an "EPDM" rubber could equivalently be produced using another α-olefin besides, or in addition to, propylene (e.g., in particular, 1-butene, 1-pentene, 1-hexene, 1-heptene, and/or 1-octene). Likewise, polyenes, and especially non-conjugated polyenes, other than dienes could be used to similar effect. Such substitutions are expressly contemplated herein.

Each of the branched and/or bimodal fraction (A) and the linear fraction (B) may have ethylene-derived units within the range from a low of 30, 40, or 50 wt % to a high of 60, 70, or 80 wt % (based on total weight of the respective fraction (A) or (B)), with ranges from any of the foregoing low ends to any of the foregoing high ends contemplated. In certain embodiments, the ethylene content of each fraction may be within +/−3, 4, or 5 wt % of the other. For instance, the branched and/or bimodal fraction (A) may have 56 wt % ethylene content and the linear fraction (B) may have 53 wt % ethylene content, such that it can be said the ethylene content of the fraction (A) fraction is within 3 wt % of the ethylene content of fraction (B) (specifically, it is 3 wt % more).

Where polyenes are utilized as comonomers, the polyene (preferably non-conjugated diene, such as ENB) content of the branched and/or bimodal fraction (A) according to some embodiments is within the range from a low of 0, 1, 2, 2.5, 3, 3.5, 4, 4.5 or 5 wt % to a high of 5.5, 6, 6.5, 7, 7.5, 8, 9, 10, 11, 12, 13, or 14 wt % (based on the total weight of the fraction (A)), with ranges from any of the foregoing low ends to any of the foregoing high ends also contemplated. In particular embodiments, the branched and/or bimodal fraction (A) comprises 3.5, 4, or 4.5 wt % to 5, 5.5, 6, 6.5, 8, 9, or 10 wt % polyene. Polyene content of the linear fraction (B) may be within the range from a low of 0, 1, 2, 2.5, 3, 3.5, or 4 to a high of 4.5, 5, 5.5, 6, 6.5, 7, 7.5, 8, 9, 10, 11, or 12 wt % (based on the total weight of the linear fraction (B)), with ranges from any of the foregoing low ends to any of the foregoing high ends also contemplated. In certain embodiments, the polyene content of the linear fraction (B) is less than the polyene content of the fraction (A); for instance, the polyene content of the linear fraction (B) may be 0 to 3 wt %, 0 to 2 wt %, or 1 to 2 wt % less than the polyene content of the fraction (A) (that is, such that [wt % polyene in A]-[wt % polyene in B] is within the range from 0 to 3, 0 to 2, or 1 to 2).

In several embodiments, the branched and/or bimodal fraction (A) exhibits higher molecular weight and/or a greater degree of branching than the linear fraction (B). In such embodiments, the copolymers of the branched and/or bimodal fraction (A) have higher Mooney Viscosity and/or Mooney Relaxation Area (preferably both) than the copolymers of the linear fraction (B).

In particular embodiments, the branched and/or bimodal fraction (A) may have Mooney Viscosity (MST, 5+4 @ 200° C.) within the range from 10 to 80 MU, such as within the range from a low of any one of 10, 11, 12, 13, 14, 15, 16, 17, 18, 19, 20, and 21 MU to a high of any one of 25, 26, 27, 28, 29, 30, 31, 32, 33, 34, 35, 36, 37, 38, 39, 40, 45, 50, 55, 60, 65, 70, 75, and 80 MU, such as within the range from 14 to 40 MU, 16 to 27 MU, 21 to 25 MU, 20 to 30 MU, etc. The fraction (A) may have corrected Mooney Relaxation Area cMSTRA (at a reference of 50 MU (MST, 5+4@ 200° C.) of at least 600, preferably at least 800 MU-sec, such as within the range from 600 to 2000 MU-sec, preferably 800 to 1500 MU-sec, such as 900 to 1200 or 925 to 1100 MU-sec, with ranges from any of the foregoing low ends to any of the foregoing high ends also contemplated in various embodiments.

The linear fraction (B) may have Mooney Viscosity (ML, 1+4 @ 125° C.) within the range from 5 to 100 MU, such as within the range from a low of any one of 5, 7, 9, 10, 12, 15, 20, 25, 30, 35, 40, 45, and 50 MU, to a high of any one of 30, 35, 40, 45, 50, 55, 60, 65, 70, 75, 80, 85, 90, 95, and 100 MU, provided that the high end of the range is greater than the low end. Example ranges include any of the foregoing, such as within the range from 20 to 70 MU, 25 to 55 MU, 50 to 60 MU, etc. The linear fraction (B) may also have corrected Mooney Relaxation Area cMLRA within the range from a low of any one of 15, 20, 25, 30, 50, 75, 80, 85, 90, 95, 100, 105, 110, and 115 MU-sec to a high of any one of 75, 80, 85, 90, 95, 100, 110, 120, 130, 140, 150, 160, 170, 180, 190, 200, 225, 250, 275, 300, 325, and 350 MU-sec, provided the high end of the range is greater than the low end. Example ranges include any of the foregoing, such as within the range from 90 to 150 MU-sec, 100 to 120 MU-sec, 115 to 200 MU-sec, 110 to 140 MU-sec, 110 to 350 MU-sec, 100 to 250 MU-sec, etc.

Certain embodiments employ lower-Mooney fraction (B), such that the fraction (B) of these embodiments has Mooney Viscosity (ML, 1+4@ 125° C.) within the range from 5, 10, 15, 20, or 25 MU to 30, 35, or 40 MU, and corrected Mooney Relaxation Area (cMLRA) within the range from 15 or 20 MU-sec to 75, 80, 100 or 115 MU-sec. Yet other embodiments may employ higher-Mooney fraction (B), such that fraction (B) has Mooney Viscosity (ML, 1+4@ 125° C.) within the range from 30, 40, 45, or 50 MU to 55, 60, 65, 70, 75, 80, 85, 90, 95, or 100 MU, and corrected Mooney Relaxation Area cMLRA within the range from 105, 110, or 115 MU-sec to 150, 200, 225, 250, 275, 300, 325, or 350 MU-sec.

The branched and/or bimodal fraction (A) may further be characterized as having T-branching topology (as opposed to hyperbranching and/or branching-on-branching topology).

The blend comprising the branched and/or bimodal fraction (A) and the linear fraction (B) may have one or more, preferably two or more, most preferably all, of the following characteristics:

Ethylene content within the range from a low of 30, 40, or 50 wt % to a high of 60, 70, or 80 wt % (based on the weight of the blend), with ranges from any of the foregoing low ends to any of the foregoing high ends contemplated.

Polyene content (where present) within the range from a low of 0, 1, 2, 3, or 4 wt % to a high of 5, 6, 7, 8, 9, or 10 wt % (based on weight of the blend), with ranges from any of the foregoing low ends to any of the foregoing high ends contemplated.

Mooney viscosity within the range from a low of 30, 40, 50, 60, 65, 70, 75, or 80 MU to a high of 70, 75, 80, 85, 90, 95, or 100 MU (ML, 1+4@ 125° C.), provided the high end of the range is greater than the low end. In embodiments employing a lower-Mooney linear fraction (B), Mooney viscosity of the blend may be within the range from 30, 40, 50 or 60 MU to 75 or 80 MU; in embodiments employing higher-Mooney linear fraction (B), Mooney viscosity of the blend may be within the higher ranges from 75 to 100 MU, such as from 80 to 90 MU. Ranges from any of the foregoing low ends to any of the foregoing high ends are also contemplated in various embodiments.

Mooney Relaxation Area (cMLRA) within the range from 200, 250, 300, 350, 400, or 450 MU-sec to 500, 550, 600, 650, 700, 750, or 800 MU-sec, such as within the range from 350 to 550 MU-sec. In embodiments employing lower-Mooney linear fraction (B), cMLRA of the blend may be within the range from 200 to 500 MU-sec, such as within the range from 350 to 450 MU-sec. In embodiments employing higher-Mooney linear fraction (B), cMLRA of the blend may be higher, such as within the range from 450 to 800 MU-sec, or 500 to 700 MU-sec. Ranges from any of the foregoing low ends to any of the foregoing high ends are also contemplated in various embodiments.

Making the Ethylene Copolymer Blends

The branched and/or bimodal ethylene copolymer fraction (A) according to various embodiments is preferably made using a dual metallocene catalyst system, which comprises a first metallocene catalyst that is a high-Mooney-producing catalyst, or "HMP catalyst" for short and a second metallocene catalyst that is a vinyl-termination-producing catalyst, or "VTP catalyst" for short. These labels are used herein for the sake of convenience, but are not intended, alone, to limit the polymers produced by the catalyst. Instead, as will be discussed in greater detail below, the HMP catalyst is capable of producing high-Mooney polymer compositions (i.e., longer or higher molecular weight chains); the VTP catalyst produces relatively lower-Mooney polymer compositions (i.e., shorter or lower molecular weight chains) having a portion of vinyl terminated chains. Used together in a dual metallocene catalyst system, the catalysts may (i) produce a bimodal polymer composition (the high-Mooney fraction produced by the HMP catalyst; the low-Mooney fraction produced by the VTP catalyst), wherein (ii) the high-Mooney fraction exhibits rheology consistent with long-chain-branching. Without wishing to be bound by theory, it is believed that the rheology of the high-Mooney fraction is due at least in part to the VTP catalyst's production of vinyl-terminated polymer chains, which are incorporated into the growing high-molecular weight polymer chains by the HMP catalyst, thereby resulting in long chain branches in such high-molecular weight polymer chains.

The molar ratio of HMP:VTP catalyst in the dual metallocene catalyst systems of some embodiments may be varied depending upon desired properties of the branched and/or bimodal ethylene copolymer fraction (A). For most catalyst systems, lower HMP:VTP catalyst molar ratios tend to favor smaller and more branched polymer chain production. The Mooney viscosity and Mooney relaxation area (MLRA) of the ethylene copolymer fraction (A) increases first with the increasing molar ratio of the HMP catalyst to the VTP catalyst, then decreases after reaching to a maximum value. The corrected Mooney relaxation area (cMLRA) decreases with the increasing molar ratio of the HMP catalyst to the VTP catalyst. For instance, lower molar ratio of the HMP catalyst to the VTP catalyst may produce branched and/or bimodal ethylene copolymer (A) with relatively lower Mooney viscosity, but relatively higher corrected Mooney relaxation area (cMLRA). In such embodiments, the target Mooney and Mooney Relaxation Area are obtained using catalyst ratios (molar ratio of first (e.g., HMP) to second (e.g., VTP) metallocene catalyst) within the range from 0.1:1 to 5:1, preferably 0.2:1 to 5:1 or 0.2:1 to 4:1, or even 0.2:1 to 3:1, with ranges from any of the foregoing low ends to any of the foregoing high ends also contemplated in various embodiments.

The linear ethylene copolymer fraction (B) according to various embodiments is preferably made using a HMP catalyst—which may, in certain embodiments, be a catalyst of the same chemical composition as the HMP catalyst of the dual metallocene catalyst system used for production of the branched and/or bimodal copolymer fraction (A).

Processes according to some embodiments include any suitable polymerization and/or blending processes for making blends that are in accordance with the above-described blends. For instance, some processes include parallel polymerization processes. Such processes include (i) polymerizing ethylene, one or more α-olefins, and optionally one or more polyenes in the presence of a dual metallocene catalyst system in a first polymerization reaction zone; (ii) obtaining a first polymerization effluent comprising a branched and/or bimodal ethylene copolymer composition (preferably in accordance with the above description of the bimodal ethylene copolymer fraction (A)); (iii) polymerizing ethylene, one or more α-olefins, and optionally one or more polyenes in the presence of a high-Mooney-producing catalyst; and (iv) obtaining a second polymerization effluent comprising a linear ethylene copolymer composition in accordance with the above description of the linear ethylene copolymer fraction (B).

The first and second polymerization effluents may thereafter be combined to form a combined effluent, and solid copolymer blend recovered therefrom. The solid copolymer blend may preferably be in accordance with the previously described blends.

According to some embodiments, the first and second polymerizations are carried out in solution, such that the first and second polymerization effluents further comprise polymerization solvent (e.g., toluene, hexane, cyclohexane, isohexane, or other suitable polymerization solvent, which would be readily recognized by the ordinarily skilled artisan). The first and second effluents may be combined to form a combined effluent (preferably while the respective copolymer products remain in solution), and after that a copolymer blend (in accordance with the above-described blends) recovered as solid product from the solution. Recovering solid polymer product from solution is well known in the art, and may include any one or more of flash separations, liquid-liquid phase separations, and devolatilization (e.g., kneader or extruder devolatilization). Alternatively, solid polymer product may be recovered from each of the first and second effluents, and afterward subjected to post-polymerization blending (e.g., melt-mixing, co-extrusion, or the like) to form the blend.

Yet other embodiments provide series reactor blends. For instance, a first series polymerization reaction zone comprising a high-Mooney-producing catalyst may be used to polymerize ethylene, α-olefin, and optionally polyene monomers to produce a first polymerization effluent comprising the linear ethylene copolymer fraction (B). That first effluent is then fed to a second polymerization reaction zone (optionally with additional ethylene, α-olefin, and optional polyene monomer), and polymerized in the presence of a dual metallocene catalyst system to produce the blend comprising the copolymer fraction (A) and the linear copolymer fraction (B). Other dispositions of catalysts in series reactions are also contemplated in some embodiments, including: (i) vinyl-termination-producing catalyst in a first series polymerization reaction zone, followed by a dual catalyst system in the second series polymerization reaction zone; (ii) dual catalyst system in the first series reaction zone, followed by either a vinyl-termination-producing catalyst or a high-Mooney-producing catalyst in the second series reaction zone; (iii) vinyl-termination-producing catalyst in the first series reaction zone, followed by high-Mooney-producing catalyst in the second reaction zone; or (iv) high-Mooney-producing catalyst in the first reaction zone, followed by vinyl-termination-producing catalyst in the second series reaction zone.

High-Mooney-Producing Catalyst

The High-Mooney-producing or HMP catalyst, as noted, is capable of producing high-Mooney (i.e., high-molecular weight) polymers, and it is in particular capable of incorporating vinyl-terminated polymer chains into the high-Mooney polymers it produces. Suitable catalyst compounds are described as "HMP catalysts" in Paragraphs [0076]-[0109] of WIPO Publication WO 2016/114914, which description is hereby incorporated by reference. As set forth therein, such catalysts include bridged fluorenyl-cyclopentadienyl group 4 complexes (and/or Cp-fluorenyl variants), mono-Cp amido group 4 complexes (and/or mono-Cp amido variants), biphenyl phenol (BPP) transition metal complexes, pyridyl amide transition metal complexes and/or pyridyl diamide transition metal complexes. According to some embodiments, suitable HMP catalysts may also or instead include Cp-imido catalysts and/or other catalysts such as those described in WO 99/14250 (e.g., catalysts having a ketimide ligand, such as described at p. 2, line 1-p. 5, line 20); WO 2005/090418 (e.g., catalysts having an amidine ligand, such as described at p. 2, line 5-p. 7, line 35); and/or catalysts as described in WO 2005/014674; WO 2011/054927; WO 2011/076775; WO 2014/180913; WO 2014/180922; WO 2014/202644; WO 2015/113957; and WO 2016/041818.

Particularly preferred HMP catalysts according to some embodiments include fluorenyl-cyclopentadienyl group 4 complexes having the general formula (I)

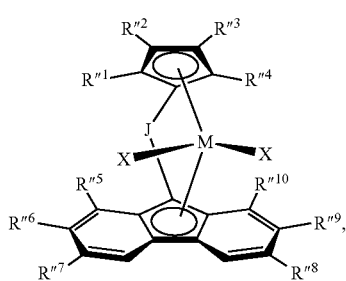

(I)

where: (1) J is a divalent bridging group (preferably comprising C, Si, or both); (2) M is a group 4 transition metal (with Hf being preferred in certain embodiments); (3) each X is independently a univalent anionic ligand, or two Xs are joined and bound to the metal atom to form a metallocycle ring, or two Xs are joined to form a chelating ligand, a diene ligand, or an alkylidene ligand; and (4) each $R'''^1$, $R'''^2$, $R'''^3$, $R'''^4$, $R'''^5$, $R'''^6$, $R'''^7$, $R'''^8$, $R'''^9$, and $R'''^{10}$ is independently hydrogen, $C_1$-$C_{50}$ substituted or unsubstituted alkyl (preferably unsubstituted $C_1$-$C_{10}$ alkyl, more preferably $C_1$-$C_5$ alkyl), provided that any one or more of the pairs $R'''^1$ and $R'''^2$, $R'''^3$ and $R'''^4$, $R'''^5$ and $R'''^6$, $R'''^6$ and $R'''^7$, $R'''^8$ and $R'''^9$, and $R'''^9$ and $R'''^{10}$, may optionally be bonded together to form a saturated or partially saturated cyclic or fused ring structure. In some embodiments J is a bridging group comprising carbon and/or silicon atoms, such as dialkylsilyl; preferably J is selected from $CH_2$, $CH_2CH_2$, $C(CH_3)_2$, $SiMe_2$, $SiEt_2$, $SiPh_2$, $SiMePh$, $Ph_2C$, $(p$-$(Et)_3SiPh)_2C$, $Si(CH_2)_3$, $Si(CH_2)_4$, and $Si(CH_2)_5$, where Me is methyl, Et is ethyl, and Ph is phenyl, and where $Si(CH_2)_x$ each indicate a cyclic silylene moiety having x carbons and the silicon atom in the cyclic group, e.g., where x is 4 in such compounds, J is cyclotetramethylenesilylene.

It will be understood by the ordinarily skilled artisan that by reference to compounds having structure in accordance with formula (I), both the activated and un-activated (precursor) forms of the compound are contemplated.

In certain embodiments, (1) $R'''^6$ and $R'''^9$ are each $C_1$ to $C_4$ alkyl, preferably $C_4$ alkyl such as tert-butyl; (2) $R'''^1$-$R'''^4$, $R'''^5$, $R'''^7$, $R'''^8$, and $R'''^{10}$ are each independently methyl, ethyl, or H (preferably, each is H); (3) J is selected from any of the groups just noted above (preferably J is $(p$-$(Et)_3SiPh)_2C$); (4) M is Hf; and (6) each X is independently $C_1$-$C_3$ alkyl or a halide (preferably each X is methyl).

A particularly preferred HMP catalyst according to some embodiments comprises 1,1'-bis(4-triethylsilylphenyl)methylene-(cyclopentadienyl)(2,7-di-tertiary-butyl-fluoren-9-yl) hafnium dimethyl.

In other embodiments, a HMP catalyst may comprise a mono-Cp amido group 4 complex, such as those in accordance with the description at Paragraphs [0079]-[0085] of WO 2016/114914, which description is herein incorporated by reference.

In yet other embodiments, the HMP catalyst may comprise a chelated transition metal complex (type 1) as described in Paragraphs [0093]-[0098] of WO 2016/114914, which description is herein incorporated by reference. These include in particular biphenyl phenol transition metal complexes, such as those in accordance with the description in Paragraphs [0094]-[0098] of WO 2016/114914, which description is herein incorporated by reference. For further description of such compounds, see also WO2003/091262, WO2005/108406, US 2006/0025548, US 2006/0052554, WO2007/136494, WO2007/136496, WO2007/136495, WO2009/064482, and WO2013/096573, each of which is incorporated by reference herein.

In some further embodiments, the HMP catalyst comprises chelated transition metal complexes (type 2) including pyridyl amide transition metal complexes, as described in Paragraphs [0099]-[00101] of WO 2016/114914, which description is herein incorporated by reference. For further description of such compounds, see also WO2010/0227990, US 2004/0220050, WO2004/026925, WO2004/024740, WO2004/024739, WO2003/040201, WO2002/046249, and WO2002/038628, which are incorporated by reference herein.

In yet further embodiments, suitable HMP catalysts include chelated transition metal complexes (type 3), e.g., pyridyl diamide transition metal complexes, such as those described in Paragraphs [0102]-[0109] of WO 2016/114914, which description is herein incorporated by reference. For further description of such compounds, see also US 2014/0316089, WO2012/134614, WO2012/134615, WO2012/134613, US 2012/0071616, US 2011/0301310, and US 2010/0022726, each of which is incorporated by reference herein.

Vinyl-Termination-Producing Catalyst

The vinyl-termination-producing, or "VTP", catalyst of some embodiments, as noted, produces relatively lower-Mooney polymer compositions (i.e., shorter chain or lower molecular weight polymers), at least a portion of which have vinyl-terminated chains suitable for incorporation into the polymer chains formed by the HMP catalyst. Suitable VTP catalyst compounds include those described as "VTP catalysts" in Paragraphs [0061]-[0075] of WO 2016/114914, which description is herein incorporated by reference. As set forth therein, particularly useful VTP catalysts include group 4 transition metal metallocene catalyst compounds having two indenyl ligands (i.e., bis-indenyl transition metal complexes). Particularly useful VTP catalyst compounds include one or more of the metallocene compounds listed and described in Paragraph [0074] of WO 2016/114914, which description is herein incorporated by reference, and/or in Paragraphs [0089]-[0090] of U.S. Ser. No. 14/325,449, filed Jul. 8, 2014, published Jan. 22, 2015 as US 2015/0025209, which is incorporated by reference herein.

In some embodiments, the VTP catalyst has structure in accordance with Formula (II)

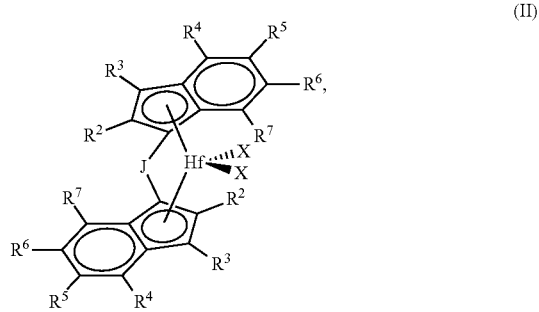

(II)

where: (1) J is a divalent bridging group comprising C, Si, or both; (2) M is a group 4 transition metal (preferably Hf); (3) each X is independently a univalent anionic ligand, or two Xs are joined and bound to the metal atom to form a metallocycle ring, or two Xs are joined to form a chelating ligand, a diene ligand, or an alkylidene ligand; and (4) each $R^2$, $R^3$, $R^4$, $R^5$, $R^6$, and $R^7$ is independently hydrogen, $C_1$-$C_{50}$ substituted or unsubstituted alkyl (preferably unsubstituted $C_1$-$C_{10}$ alkyl, more preferably $C_1$-$C_5$ alkyl), provided that any one or more of the pairs $R^4$ and $R^5$, $R^5$ and $R^6$, and $R^6$ and $R^7$ may optionally be bonded together to form a saturated or partially saturated cyclic or fused ring structure. Such compounds are also referred to as bis-indenyl metallocene compounds.

It will be understood by the ordinarily skilled artisan that by reference to compounds having structure in accordance with formula (II), both the activated and un-activated (precursor) forms of the compound are contemplated.

In certain embodiments, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof. Two Xs may form a part of a fused ring or a ring system. In particular embodiments, each X is independently selected from halides and $C_1$ to $C_5$ alkyl groups. For instance, each X may be a chloro, bromo, methyl, ethyl, propyl, butyl or pentyl group. In specific embodiments, each X is a methyl group.

J may be represented by the formula (IIa):

(IIa)

wherein J' is C or Si (preferably Si), x is 1, 2, 3, or 4, preferably 2 or 3, and each R' is, independently, hydrogen or $C_1$-$C_{10}$ hydrocarbyl, preferably hydrogen. Particular examples of J groups where J' is silicon include cyclopentamethylenesilylene, cyclotetramethylenesilylene, cyclotrimethylenesilylene, and the like. Particular examples of J groups where J' is carbon include cyclopropandiyl, cyclobutandiyl, cyclopentandiyl, cyclohexandiyl, and the like.

In some embodiments, J may be represented by the formula $(R^a_2J')_n$ where each J' is independently C or Si (again, with J' preferably Si), n is 1 or 2 (preferably n is 1), and each $R^a$ is, independently, $C_1$ to $C_{20}$ substituted or unsubstituted hydrocarbyl, provided that two or more $R^a$ optionally may be joined together to form a saturated or partially saturated or aromatic cyclic or fused ring structure that incorporates at least one J'. Particular examples of J groups include dimethylsilylene, diethylsilylene, and the like.

In particular embodiments, the VTP catalyst has structure in accordance with Formula II, and: (1) each $R^4$ and $R^7$ is independently $C_1$-$C_5$ alkyl, preferably $C_1$ to $C_3$ alkyl (and more preferably both are methyl); (2) each $R^2$ is H or $C_1$-$C_5$ alkyl, preferably $C_1$ or H, more preferably H; (3) $R^3$, $R^5$, and $R^6$ is each independently H or $C_1$-$C_5$ alkyl, preferably $C_1$ alkyl or H, more preferably H; (4) J is cyclopentamethylenesilylene, cyclotetramethylenesilylene, cyclotrimethylenesilylene, cyclopropandiyl, cyclobutandiyl, cyclopentandiyl, or cyclohexandiyl; (5) M is Hf; and (6) each X is independently a halide or $C_1$-$C_3$ alkyl, preferably methyl.

In particular embodiments, for instance, the VTP catalyst comprises one or both of: (1) cyclotetramethylenesilylene-bis(2,4,7-trimethylinden-1-yl)hafnium dimethyl; and (2) cyclotetramethylenesilylene-bis(4,7-dimethylinden-1-yl) hafnium dimethyl.

The VTP catalyst compounds can be in rac or meso form. In one particular embodiment, the VTP catalyst compound is in the rac form. For instance, at least 90 wt % of the catalyst compound may be in the rac form, based upon the weight of the rac and meso forms present. More particularly, at least any one of about 92, 93, 94, 95, 96, 97, 98, and 99 wt % of the catalyst compound may be in rac form. In one embodiment, all of the catalyst compound is in rac form.

The VTP catalyst compounds described herein may be synthesized in any suitable manner, including in accordance with procedures described in Paragraphs [0096] and

[00247]-[00298] of U.S. Ser. No. 14/325,449, filed Jul. 8, 2014, and published Jan. 22, 2015 as US 2015/0025209, which description is incorporated by reference herein.

Catalyst System Activators

The terms "cocatalyst" and "activator" are used herein interchangeably and are defined to be any compound which can activate any one of the catalyst compounds described above (including either or both of the HMP and VTP catalyst compounds) by converting the neutral catalyst compound to a catalytically active catalyst compound cation. Suitable activators are described in Paragraphs [0110]-[0115] of WO 2016/114914, which description is herein incorporated by reference; and/or in Paragraphs [0110]-[0133] of US Patent Publication No. 2015/0025209, which description is incorporated by reference herein.

Particularly useful activators in some embodiments include non-coordinating anion (NCA) activators, such as those in Paragraph [0124] of US 2015/0025209, and also those in Columns 7 and 20-21 in U.S. Pat. No. 8,658,556, which description is incorporated by reference. Particular examples of suitable NCA activators include: N,N-dimethylanilinium tetrakis(heptafluoro-2-naphthyl)borate, N,N-dimethylanilinium tetrakis(pentafluorophenyl)borate, N,N-dimethylanilinium tetrakis (perfluorobiphenyl)borate, triphenylcarbenium tetrakis(heptafluoro-2-naphthyl)borate, bis($C_4$-$C_{20}$alkyl)methylammonium tetrakis(perfluoronaphthyl)borate, trimethylammonium tetrakis(pentafluorophenyl)borate, trimethylammonium tetrakis(heptafluoro-2-naphthyl)borate, and bis(hydrogenated tallowalkyl) methylammonium tetrakis(pentafluorophenyl)borate.

The HMP and VTP catalysts may be activated by the same or by different activators. They may be activated together (when the same activator is used) or separately. In a particular embodiment, they are activated by the same activator either together or separately, preferably separately. Both catalysts can also be activated on-line in the catalyst feed line or in the polymerization reactor.

In yet other embodiments, the same activator is used to activate both catalysts of a dual metallocene catalyst system (e.g., both HMP and VTP catalyst), while the same or a different activator is used to activate the HMP catalyst (e.g., the catalyst used to produce the linear ethylene copolymer fraction). In particular embodiments, a different activator is used to activate the HMP catalyst than is used to activate the catalysts of the dual metallocene catalyst system. For example, in some embodiments, the catalysts of the dual metallocene catalyst system used to produce the branched and/or bimodal ethylene copolymer fraction (A) are activated by a first activator; while the HMP catalyst used to produce the linear ethylene copolymer fraction (B) is activated by a second activator different from the first. The first activator may comprise, e.g., N,N-dimethylanilinium tetrakis(heptafluoro-2-naphthyl)borate. The second activator may comprise, e.g., N,N-dimethylanilinium tetrakis(pentafluorophenyl)borate.

Further, the typical activator-to-catalyst molar ratio for each of the first and second metallocene catalysts is 1:1, although preferred ranges may include from 0.1:1 to 1000:1 (e.g., from 0.5:1 to 100:1, such as 2:1 to 50:1).

In some embodiments, the activator(s) is/are contacted with a catalyst compound to form the catalyst system comprising activated catalyst and activator or other charge-balancing moiety, before the catalyst system is contacted with one or more monomers. In other embodiments, the activator(s) may be co-fed to catalyst compound(s) together with one or more monomers. Preferably, each catalyst is contacted with its respective activator(s) before being mixed together and/or before being fed into the polymerization reaction zone.

Optional Scavengers or Co-Activators

In addition to the activator compounds, scavengers or co-activators may be used in conjunction with the first and second metallocene catalysts in a polymerization reaction zone. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum and the like. Other oxophilic species such as diethyl zinc may be used.

Rubber Compounds Made from Ethylene Copolymer Blends

The ethylene copolymer blends of some embodiments may be formulated and/or processed with any one or more various additives (e.g., curatives or cross-linking agents, fillers, process oils, and the like) to form rubber compounds suitable for making articles of manufacture. For instance, rubber compounds according to some such embodiments include, in addition to the copolymer composition, any components suitable for an EPDM rubber formulation. For example, any of various known additives (fillers, plasticizers, compatibilizers, cross-linkers, and the like) may be formulated with the ethylene copolymer blends of certain embodiments, providing a rubber compound or rubber formulation.

Where curatives, i.e., cross-linking agents or vulcanizing agents, are utilized, the ethylene copolymer blend may be present in the rubber compound in at least partially cross-linked form (that is, at least a portion of the polymer chains of the devolatilized elastomer composition are cross-linked with each other, e.g., as a result of a curing process typical for EPDM rubbers).

Accordingly, particular embodiments provide for an at least partially cross-linked rubber compound made by mixing a formulation comprising: (a) an ethylene copolymer blend (e.g., in accordance with any of the above-described embodiments of ethylene copolymer blends; (b) one or more vulcanization activators; (c) one or more vulcanizing agents; and (d) optionally, one or more further additives.

Suitable vulcanization activators include one or more of zinc oxide, stearic acid, and the like. These activators may be mixed in amounts ranging from about 0 to 20 phr. As used herein, "phr" means parts per hundred parts rubber, where the "rubber" is taken as the ethylene copolymer blend in the formulation. Thus, for activator to be formulated with ethylene copolymer blend at 15 phr, one would add 15 g activator to 100 g ethylene copolymer blend. Unless specified otherwise, phr should be taken as phr on a weight basis. Different vulcanization activators may be employed in different amounts. For instance, where the vulcanization activator includes zinc oxide, the zinc oxide may be employed at amounts ranging from 1 to 20 phr, such as 2.5 to 10 phr (e.g., about 5 phr), while stearic acid may preferably be employed in amounts ranging from 0.1 to 5 phr, such as 0.1 to 2.0 phr (e.g., about 1.0 or 1.5 phr). In some embodiments, multiple vulcanization activators may be utilized (e.g., both ZnO and stearic acid).

Any vulcanizing agent known in the art may be used. Of particular note are curing agents as described in Col. 19, line 35 to Col. 20, line 30 of U.S. Pat. No. 7,915,354, which description is hereby incorporated by reference (e.g., sulfur, peroxide-based curing agents, resin curing agents, silanes, and hydrosilane curing agents). Other examples include phenolic resin curing agents (e.g., as described in U.S. Pat.

No. 5,750,625, also incorporated by reference herein). Cure co-agents may also be employed (e.g., as described in the already-incorporated description of U.S. Pat. No. 7,915, 354).

The further additives (used in any compound and/or in an at least partially cross-linked rubber compound according to various embodiments) may be chosen from any known additives useful for EPDM formulations, and include, among others, one or more of:

Process oil, such as API Group I, II, or III base oils, including aromatic, naphthenic, paraffinic, and/or isoparaffinic process oil (examples including Sunpar™ 2280 (available from HollyFrontier Refining & Marketing LLC, Tulsa, Okla.); as well as Flexon™ 876, CORE™ 600 base stock oil, Flexon™ 815, and CORE™ 2500 base stock oil, available from ExxonMobil Chemical Company, Baytown, Tex. Process oil may be present in the formulation at 1-150 phr (when present), and preferred process oils have viscosity at 40° C. ranging from 80 to 600 CSt. The ordinarily skilled artisan will understand that, for applications requiring a color other than black, and/or in which color of the final article is important, a paraffinic or isoparaffinic oil (e.g., having aromatic and/or heteroatom content less than 1 wt % total, preferably less than 0.1 wt % total), sometimes referred to as "white oils," may be particularly preferred. Many API Group II and/or III base oils may satisfy such applications.

Vulcanization accelerators, present in the formulation at 0 to 15 phr total, such as 1-5, or 2-4 phr, with examples including one or more of: thiazoles such as 2-mercaptobenzothiazole or mercaptobenzothiazyl disulfide (MBTS); guanidines such as diphenylguanidine; sulfenamides such as N-cyclohexylbenzothiazol-sulfenamide; dithiocarbamates such as zinc dimethyl dithiocarbamate, zinc diethyl dithiocarbamate, zinc dibenzyl dithiocarbamate (ZBEC); and zincdibutyldithiocarbamate, thioureas such as 1,3-diethylthiourea, thiophosphates and others.

Processing aids (e.g., polyethylene glycol or zinc soap).

Carbon black (e.g., having particle size from 20 nm to 600 nm and structure having DBPA (dibutyl phthalate absorption number) within the range from 0 to 150, as measured by the DBP method described in ASTM D2414), which may be present in the formulation at 0-500 phr, preferably 0-200 phr, such as within the range of 50-150 phr.

Mineral fillers (talc, calcium carbonate, clay, silica, aluminum trihydrate, and the like), which may be present in the formulation from 0 to 200 phr, preferably from 20 to 100 phr, such as in the range of 30 to 60 phr.

Various other additives, such as antioxidants, stabilizers, anticorrosion agents, UV absorbers, antistatics, slip agents, moisture absorbents (e.g., calcium oxide), and pigments, dyes and other colorants.

As noted, the at least partially cross-linked rubber compounds of some embodiments are formed by mixing the above-described formulations. Mixing in these embodiments may include any one or more of typical mixing processes for EPDM compositions, such as open mill mixing, mixing using internal mixers or kneaders, and extrusion (e.g., through an extruder, such as a twin-screw or other multi-screw extruder).

Formulations comprising the ethylene copolymer blends of various embodiments, and particularly blends made with a higher-Mooney linear fraction (B), surprisingly exhibit much lower viscosity than would be expected from the Mooney viscosity of the copolymer compositions, while also having advantageously fast cure rate. This means that the formulation comprising such copolymer blends are much more easily processed than one might typically expect.

One means of quantifying this phenomenon is by measuring the Mooney viscosity of the compound formed by mixing the formulations (referred to herein as "compound Mooney viscosity" or "compound ML" when a Mooney-Large rotor is used for this viscosity measurement), and dividing such compound Mooney viscosity by the measured Mooney viscosity of the ethylene copolymer blend itself, giving the ratio compound Mooney viscosity to ethylene copolymer blend Mooney viscosity (which may be referred to in the shorthand as "Cpd Mooney/Blend Mooney" or simply as "Mooney Ratio"). It should be noted that the compound Mooney is determined according to the previously-described Mooney viscosity measurement procedure (see "Definitions" section above), with the compound sample being subjected to testing instead of the raw polymer sample (with sample prep and all measurements otherwise carried out as described above for a polymer sample). In addition, it is preferred that the same formulation be used for each copolymer composition being compared, when forming the compound for each respective copolymer composition being compared. Further, where conditions for the compound Mooney measurements differ from conditions for the polymer measurements, such should be noted. For instance, in some instances, temperature for compound Mooney measurements may be lower than temperature for polymer Mooney measurements (e.g., 100° C. for compound measurements instead of 125° C. used for many polymer measurements). Such instances should simply be pointed out along with the reported Mooney measurement.

The compound viscosity (Mooney Viscosity of the compound) of at least partially cross-linked rubber compounds in accordance with some embodiments is within the range from 70 to 95 MU, preferably 75 to 93 MU, or 80 to 92 MU, such as from 82 to 90 MU (ML, 1+4 @ 100° C.), with ranges from any of the foregoing lows to any of the foregoing highs also contemplated in various embodiments.

The Cpd Mooney/Blend Mooney ("Compound Mooney Ratio") for compounds made from copolymer blends of certain embodiments ranges from 0.8 to 1.2, preferably from 0.9 to 1.15, such as from 1.0 to 1.15 or 1.0 to 1.1 (compound ML, 1+4 @ 100° C./blend ML, 1+4 @ 125° C.). Lower Cpd Mooney/Blend Mooney ratios are desirable, as this indicates a relatively minor increase in viscosity for the compound vs. the copolymer blend viscosity increase, which enables much easier processing (e.g., mixing to form compounds and/or molding to form a shaped article from such compounds, according to certain embodiments).

At least partially cross-linked rubber compounds in accordance with some embodiments may also or instead exhibit one or more, preferably two or more, most preferably all, of the following properties:

tan($\delta$) less than 0.80, preferably less than 0.75, such as 0.72 or less, including tan($\delta$) within the range from 0.40 to 0.80, 0.50 to 0.75, and 0.60 to 0.72, with ranges from any of the foregoing low ends to any of the foregoing high ends also contemplated in various embodiments;

shear thinning index (STI) greater than 0.9930, preferably 0.9940 or greater, such as within the range from a low of 0.9935 or 0.9940 to a high of 0.9950, 0.9960, 0.9990, or 0.9999; and absolute value of power law index A1 within the range from 0.685 to 0.750, such as within the range from a low of any one of 0.685, 0.690, 0.695, and 0.700 to a high of any one of 0.705, 0.710, 0.715, 0.720, 0.725, 0.730, 0.735, 0.740, 0.745, and 0.750.

Tan(δ), STI, and Power law index A1 are each determined in accordance with measurement techniques described in the "Test Methods" section below. Lower tan(δ) values may be desirable, as they indicate higher melt elasticity and consequently greater dimensional stability of an article after extrusion and prior to continuous vulcanization. The absolute value of power law index A1 represents a degree of shear sensitivity of the compound (e.g., its Newtonian or non-Newtonian nature). A higher absolute value denotes a higher level of shear thinning that will lead to lower viscosity at high shear rates; that is, compounds with higher absolute value of power law index A1 may be considered to be more shear-sensitive. Similarly, a higher STI indicates a greater degree of shear sensitivity.

Test Methods

Small Amplitude Oscillatory Shear (SAOS); Phase Angle (otherwise known as loss angle) δ or delta; Shear Thinning Ratio; Shear Thinning Index (STI); Relaxation Time τ; Large Amplitude Oscillatory Shear (LAOS); Mooney Large Viscosity (ML); Mooney Large Relaxation Area (MLRA); corrected MLRA (cMLRA); molecular weights (number average Mn, weight average Mw, and z-average Mz); and composition distribution are determined in accordance with the following description.

Small Amplitude Oscillatory Shear (SAOS): Dynamic shear melt rheological data was measured using the ATD® 1000 Rubber Process Analyzer from Alpha Technologies. A sample of approximately 4.5 gm weight is mounted between the parallel plates of the ATD® 1000. The test temperature is 100° C., the applied strain is 14% and the frequency was varied from 0.1 rad/s to 200 rad/s. The complex modulus (G*), complex viscosity (η*) and the phase angle (δ) are measured at each frequency (shear rate), and the complex viscosity vs. frequency (shear rate) is fit to a power law model of the following expression:

$$\eta^* = A0\gamma^{A1}$$

where γ is the shear rate expressed in rad/sec; A0 is the power law viscosity (Pa·sec), i.e., the viscosity expected at a shear rate of 1 rad/s; and A1 is the power law index (which can indicate the degree to which a fluid is Newtonian or non-Newtonian, where power law index having absolute value closer to 1 indicates Newtonian, and smaller fractions (absolute value) indicate greater non-Newtonian character). IRIS computer software (IRIS Rheo-Hub 2012, IRIS Development, Amherst, Mass.) was used to calculate A0 and A1 values from measured complex viscosities at various tested shear rates.

A nitrogen stream was circulated through the sample oven to minimize chain extension or cross-linking during the experiments. A sinusoidal shear strain is applied to the material. If the strain amplitude is sufficiently small the material behaves linearly. As those of ordinary skill in the art will be aware, the resulting steady-state stress will also oscillate sinusoidally at the same frequency but will be shifted by a phase angle δ (or delta) with respect to the strain wave. The stress leads the strain by δ (or delta). The phase angle δ, is the inverse tangent of the ratio of G" (shear loss modulus) to G' (shear storage modulus). For a typical linear polymer, the phase angle approaches 90° at low frequencies (or long times), since the polymer chains can relax quickly in the melt, absorbing energy and making G" much larger than G'. With increasing frequency, the relaxation process is not fast, the polymer chains cannot absorb all the energy imparted in the shear oscillation, with the result the storage modulus G' increases relative to G". Eventually at the cross-over point, G' equals G" and the phase angle is 45°. At much higher frequencies (or short times), G' dominates the response over G", the phase angle approaches 0°, which is indicative of the plateau region. In contrast to linear polymers, branched polymer chains relax very slowly and cannot absorb the energy that is imparted even at very low frequencies, as a result the phase angle never approaches 90° at low frequency. In general, the phase angle at a specified frequency will be much lower for a branched polymer relative to a linear polymer. Similarly, the tan(δ) will be lower for a branched polymer as compared to that of a linear polymer.

Van Gurp Palmen: The plot of the phase angle (δ) versus the complex modulus (G*) is known as the Van Gurp Palmen plot (M. Van Gurp, J. Palmen, Rheol. Bull., 67, pp 5-8, 1998). The phase angle is calculated at a G* of $10^5$ Pa for each polymer being analyzed. The plot of δ versus log (G*) was fitted to a third degree polynomial using the Least Squares method ($R^2$>0.95), and the polynomial equation was used to calculate δ at the specified G* value (e.g., $10^5$ Pa). The phase angle will decrease with higher degree of branching or increased polydispersity (molecular weight distribution, or MWD).

Shear Thinning Ratio: Shear-thinning is a rheological response of polymer melts, where the resistance to flow (viscosity) decreases with increasing shear rate. The complex shear viscosity is generally constant at low shear rates (Newtonian region) and decreases with increasing shear rate. In the low shear-rate region, the viscosity is termed the zero shear viscosity, which is often difficult to measure for polydisperse and/or LCB polymer melts. At the higher shear rate, the polymer chains are oriented in the shear direction, which reduces the number of chain entanglements relative to their un-deformed state. This reduction in chain entanglement results in lower viscosity. Shear thinning is characterized by the decrease of complex dynamic viscosity with increasing frequency of the sinusoidally applied shear. Shear thinning ratio is defined as a ratio of the complex shear viscosity at frequency of 0.1 rad/sec to that at frequency of 128 rad/sec.

Shear Thinning Index: Another method of quantifying shear-thinning is to use a parameter called the shear-thinning index (STI), defined as:

$$STI = ((\eta_{0.1\ rad/s} - \eta_{128\ rad/s})/\eta_{0.1\ rad/s}),$$

Where $\eta_{0.1\ rad/s}$ and $\eta_{128\ rad/s}$ are the complex shear viscosity at a frequency of 0.1 rad/s and 128 rad/s, respectively. The shear-thinning index typically increases with branching level; thus it is believed that for highly branched polymers (and/or polymer compositions that behave like highly branched polymers), the parameter STI approaches 1 since $\eta_{0.1\ rad/s} \gg \eta_{128\ rad/s}$. Conversely for Newtonian fluids, where the viscosity is independent of shear rate, STI approaches 0.

Mooney viscosity (ML and MST) & Mooney Relaxation Area (MLRA, MSTRA): See the "Definitions" section, which includes a full description of measuring Mooney viscosities and Mooney Relaxation Areas for purposes of the present application.

Molecular Weight and Composition Distribution by GPC-3D: Molecular weights (number average molecular weight (Mn), weight average molecular weight (Mw), and z-average molecular weight (Mz)) are determined using a Polymer Laboratories Model 220 high temperature GPC-SEC (gel permeation/size exclusion chromatograph) equipped with on-line differential refractive index (DRI), light scattering (LS), and viscometer (VIS) detectors. It uses three Polymer Laboratories PLgel 10 m Mixed-B LS columns for separation using a flow rate of 0.54 ml/min and a nominal injection volume of 300 microliter. The detectors and columns were contained in an oven maintained at 145° C. The stream emerging from the SEC columns was directed into the miniDAWN optical flow cell and then into the DRI detector. The DRI detector was an integral part of the Polymer Laboratories SEC. The viscometer was inside the SEC oven, positioned after the DRI detector. The details of these detectors as well as their calibrations have been described by, for example, T. Sun et al., in Macromolecules, Volume 34, Number 19, pp. 6812-6820, (2001), incorporated herein by reference. This GPC SEC-DRI-LS-VIS method may also be referred to by the shorthand "GPC-3D."

Solvent for the SEC experiment was prepared by dissolving 6 grams of butylated hydroxy toluene (BHT) as an antioxidant in 4 liters of Aldrich reagent grade 1, 2, 4-trichlorobenzene (TCB). The TCB mixture was then filtered through a 0.7 micrometer glass pre-filter and subsequently through a 0.1 micrometer Teflon filter. The TCB was then degassed with an online degasser before entering the SEC. Polymer solutions were prepared by placing dry polymer in a glass container, adding the desired amount of BHT stabilized TCB, then heating the mixture at 160° C. with continuous agitation for about 2 hours. All quantities were measured gravimetrically. The TCB densities used to express the polymer concentration in mass/volume units are 1.463 g/mL at 22° C. and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc),$$

where $K_{DRI}$ is a constant determined by calibrating the DRI with a series of mono-dispersed polystyrene standards with molecular weight ranging from 600 to 10M, and (dn/dc) is the refractive index increment for the system. The refractive index, n=1.500 for TCB at 145° C. and λ=690 nm. For purposes of this invention and the claims thereto (dn/dc)=0.1048 for ethylene-propylene copolymers, and (dn/dc)=0.01048−0.0016ENB for EPDM, where ENB is the ENB content in wt % in the ethylene-propylene-diene terpolymer. Where other non-conjugated polyenes are used instead of (or in addition to) ENB, the ENB is taken as weight percent of total non-conjugated polyenes. The value (dn/dc) is otherwise taken as 0.1 for other polymers and copolymers. Units of parameters used throughout this description of the SEC method are: concentration is expressed in g/cm³, molecular weight is expressed in g/mol, and intrinsic viscosity is expressed in dL/g.

The light scattering (LS) detector was a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c,$$

Here, $\Delta R(\theta)$ is the measured excess Rayleigh scattering intensity at scattering angle θ, c is the polymer concentration determined from the DRI analysis, $A_2$ is the second virial coefficient (for purposes of this invention, $A_2$=0.0015 for ethylene homopolymer and $A_2$=0.0015−0.00001EE for ethylene-propylene copolymers, where EE is the ethylene content in weight percent in the ethylene-propylene copolymer. $P(\theta)$ is the form factor for a mono-disperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and λ=690 nm. For purposes of this application, where DRI and LS measurements conflict, LS measurements should be used for Mw and Mz, while DRI measurements should be used for Mn. And, although MWD (polydispersity) is taken as Mw/Mn, where DRI and LS measurements conflict, MWD should be determined as Mw (measured by LS)/Mn (measured by DRI), or $Mw_{LS}/Mn_{DRI}$.

Molecular weight distribution and Composition Distribution by GPC-IR (GPC-4D): Where indicated, GPC-IR (sometimes also referred to as GPC-4D) may instead be used to determine the distribution and the moments of molecular weight (e.g., Mn, Mw, Mz, etc.) and/or the comonomer distribution (C2, C3, C6, etc.). According to the GPC-IR procedure, distribution and moments of molecular weight and/or comonomer distribution are determined with a high temperature Gel Permeation Chromatography (Polymer-Char GPC-IR) equipped with a multiple-channel band filter based infrared (IR) detector ensemble IR5, in which a broad-band channel is used to measure the polymer concentration while two narrow-band channels are used for characterizing composition. Three Agilent PLgel 10 μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 micrometer Teflon filter and degassed with an online degasser before entering the GPC instrument. The nominal flow rate is 1.0 mL/min and the nominal injection volume is 200 microliter. The whole system including transfer lines, columns, detectors are contained in an oven maintained at 145° C. Given amount of polymer sample is weighed and sealed in a standard vial with 10 microliter flow marker (Heptane) added to it. After loading the vial in the autosampler, polymer is automatically dissolved in the instrument with 8 mL added TCB solvent. The polymer is dissolved at 160° C. with continuous shaking for about 1 hour for most PE samples or 2 hour for PP samples. The TCB densities used in concentration calculation are 1.463 g/ml at 22° C. and 1.284 g/ml at 145° C. The sample solution concentration is from 0.2 to 2.0 mg/ml, with lower concentrations being used for higher molecular weight samples.

The concentration, c, at each point in the chromatogram is calculated from the baseline-subtracted IR5 broadband signal, I, using the following equation:

$$c = \alpha I,$$

where α is the mass constant determined with PE standard NBS1475. The mass recovery is calculated from the ratio of the integrated area of the concentration chromatography over elution volume and the injection mass which is equal to the pre-determined concentration multiplied by injection loop volume.

The molecular weight is determined by combining universal calibration relationship with the column calibration which is performed with a series of mono-dispersed polystyrene (PS) standards. The molecular weight is calculated at each elution volume with following equation.

$$\log M_X = \frac{\log(K_X/K_{PS})}{a_X + 1} + \frac{a_{PS} + 1}{a_X + 1} \log M_{PS},$$

where K and a are the coefficients in the Mark-Houwink equation. The variables with subscript "X" stand for the test sample while those with subscript "PS" stand for polystyrene. In this method, $a_{PS}$=0.67 and $K_{PS}$=0.00017 while $a_X$ and $K_X$ are determined based on the composition of linear ethylene/propylene copolymer and linear ethylene-propylene-diene terpolymers using a standard calibration procedure. See T. Sun, P. Brant, R. R. Chance, and W. W. Graessley, "Effect of Short Chain Branching on the Coil Dimensions of Polyolefins in Dilute Solution," Macromolecules, Volume 34, Number 19, pp. 6812-6820, (2001). The comonomer composition is determined by the ratio of the IR detector intensity corresponding to $CH_2$ and $CH_3$ channel calibrated with a series of PE and PP homo/copolymer standards whose nominal value are predetermined by NMR. For purposes of the present application, $K_X$=0.000579 and $a_X$=0.695 for ethylene polymers, and $K_X$=0.0002288 and $a_X$=0.705 for propylene polymers. For EP, the values of $K_X$ and $a_X$ are determined based on the ethylene/propylene composition using a standard calibration procedure such that: $K_X$=(1−0.0048601EP−6.8989×10$^{-6}$EP$^2$)×5.79×10$^{-4}$ (200000)$^{-Trunc(0.1EP)/1000}$ and $a_X$=0.695+Trunc(0.1EP)/1000, where EP is the weight percent of propylene in the EP, and Trunc indicates that only the integer portion is kept in the calculation. For example, Trunc(5.3)=5.

Either GPC-SEC (GPC-3D) or GPC-IR (GPC-4D) may be used to determine molecular weights, molecular weight distributions, and/or composition distributions, as specified in context herein. Where neither method is specified, or where results of the two methods conflict, it is preferred to use the GPC-SEC (GPC-3D) method detailed above.

Ethylene Content: Ethylene content is determined using FTIR according to ASTM D3900 and is not corrected for diene content unless the ethylene content measurement is specifically stated as "correct" or "corr" or the like. ENB is determined using FTIR according to ASTM D6047. The content of other diene if present can be obtained using $C^{13}$ NMR. Corrected ethylene wt % s are calculated as follows, where a corrected measurement is indicated: % C2 (corr) =(% C2 (uncorr)/(100+% diene)*100).

Cured Rubber Article Properties: Hardness is measured per ASTM D2250; tensile modulus at various % elongation (e.g., 100, 200, 300%) and elongation, stress, and strain at break are determined in accordance with ASTM D-412, using Die C.

EXAMPLES

Example 1

Polymerizations were carried out using a solution process in two 28 L continuous stirred tank reactors (CSTRs) in parallel. Feeds of solvent (isohexane, iC6), monomers, hydrogen, and scavenger were provided to each reactor. Solutions of metallocene catalyst(s) and activator in toluene were metered into the reactors and the heats of polymerization used to drive the solution temperatures to the target values (in this Example, Reactor 1 temp was about 95° C., and Reactor 2 temp was about 105° C. The polymerizations were balanced to obtain approximately equal amounts of polymer in both reactors. The effluent was combined downstream of the reactors and treated with trace amounts of methanol to halt the polymerization. The mixture was then freed from solvent via a low-pressure flash separation, treated with antioxidant, then subjected to a devolatilizing extruder process. The dried polymer was then pelletized.

Reactor 1 Catalyst Solution Preparation:

in a nitrogen-filled glove box, a 4 L Erlenmeyer flask was first charged with 1 L of air-free anhydrous toluene; then with 0.718 g (1.24 mmol) catalyst A (which was $(CH_2)_4Si(4,7-Me_2Indenyl)_2HfMe_2$, i.e., cyclotetramethylenesilylene-bis(4,7-dimethylinden-1-yl)hafnium dimethyl); then with 2 g (2.12 mmol) of catalyst B (which was p-SiEt$_3$C$_6$H$_4$)$_2$C(2,7-tBu$_2$Fluorenyl) (cyclopentadienyl)HfMe$_2$, i.e., 1,1'-bis(4-triethylsilylphenyl)methylene-(cyclopentadienyl)(2,7-di-tertiary-butyl-fluoren-9-yl)hafnium dimethyl); then with 3.735 g (3.26 mmol) of activator A1, which was PhNMe$_2$H$^+$ B(C$_{10}$F$_7$)$_4^-$ (N,N-dimethylanilinium tetrakis(heptafluoro-2-naphthyl)borate); and finally with an additional 3 L of toluene. After the solids dissolved, with stirring, the solution was charged into an ISCO pump and metered into the reactor.

Reactor 2 Catalyst Solution Preparation:

In a nitrogen-filled glove box, a 4 L Erlenmeyer flask was charged with 1 L of air-free anhydrous toluene; then with 2 g (2.12 mmol) of catalyst B; then with 1.644 g (2.05 mmol) of activator A2, which was PhNMe$_2$H$^+$ B(C$_6$F$_5$)$_4^-$ (N,N-dimethylanilinium tetrakis(pentafluorophenyl)borate); and finally with an additional 3 L of toluene. After the solids dissolved, with stirring, the solution was charged into an ISCO pump and metered into the reactor.

Polymerization reaction conditions as well as feed rates (monomers, catalyst, solvent, hydrogen) are reported in Table 1.1 for each reactor (where R1 denotes a parameter for Reactor 1, and R2 denotes a parameter for Reactor 2) used to make Sample 1 and Sample 2 polymer blends. Polymer production rates were 7 Kg/h and 7.6 Kg/h for samples 1 and 2, respectively. They were made with equal amounts of the R1 and R2 components (50:50 polysplit).

TABLE 1.1

Experimental Conditions for Example 1 Polymerizations

| Parameter | Sample 1 | Sample 2 |
|---|---|---|
| R1 Temp (° C.) | 95.1 | 94.9 |
| R1 Pressure (psig) | 1609 | 1539 |
| R1 Feed Temp (° C.) | 14.8 | 14.9 |
| R1 Feed C2 (kg/h) | 3.4 | 3.378 |
| R1 Feed C3 (kg/h) | 4.9 | 4.873 |
| R1 Feed iC6 (kg/h) | 38.6 | 38.3 |
| R1 Feed ENB (kg/h) | 0.6 | 0.608 |
| R1 Feed TNOA* (kg/h) | 0.015 | 0.015 |
| R1 Feed H2 (sccm) | 0 | 0 |
| R1 Feed Catalyst Solution (mL/min) | 1.7 | 1.7 |
| R2 Temp (° C.) | 105.0 | 105.0 |
| R2 Pressure (psig) | 1605 | 1533 |
| R2 Feed Temp (° C.) | 15.0 | 14.8 |
| R2 Feed C2 (kg/h) | 3.1 | 3.1 |
| R2 Feed C3 (kg/h) | 3.3 | 3.3 |

TABLE 1.1-continued

Experimental Conditions for Example 1 Polymerizations

| Parameter | Sample 1 | Sample 2 |
|---|---|---|
| R2 Feed iC6 (kg/h) | 35.0 | 34.8 |
| R2 Feed ENB (kg/h) | 0.5 | 0.5 |
| R2 Feed TNOA (kg/h) | 0.016 | 0.015 |
| R2 Feed H2 (sccm) | 60.4 | 29.6 |
| R2 Feed Catalyst Solution (mL/min) | 1.5 | 1.6 |

*TNOA is tri-n-octylaluminum

Some pellets were made from product from each individual reactor R1 and R2 (i.e., solid polymer was isolated from each reactor's effluent via flash separation and devolatilization) so as to characterize each fraction produced in the R1 and R2 reactors, respectively. These values are reported in Table 1.2 below.

TABLE 1.2

Characterization of R1 and R2 Polymers

| Parameter | Sample 1 | Sample 2 |
|---|---|---|
| R1 C2 (wt %) | 56.3 | 56.1 |
| R1 ENB (wt %) | 5.1 | 5.2 |
| R1 MU (MST, 5 + 4 @ 200° C.) | 23.4 | 24.2 |
| R1 MSTRA (MU-sec) | 323.8 | 341.0 |
| R1 cMSTRA (MU-sec, 50 MU (MST, 5 + 4 @ 200° C.) reference) | 966.3 | 969.6 |
| R2 C2 (wt %) | 58.1 | 56.1 |
| R2 ENB (wt %) | 4.3 | 4.8 |
| R2 MU (ML, 1 + 4 @ 125° C.) | 27.5 | 51.2 |
| R2 MLRA (MU-sec) | 24.1 | 64.0 |
| R2 cMLRA (MU-sec, 80 MU (ML, 1 + 4 @ 125° C.) reference) | 112.2 | 121.7 |

Table 1.3 reports the characterization of the pellets made from combining the R1 and R2 effluents as described above, using a polysplit of 50% (i.e., such that the pellet was made from blending 1 part by weight R1 polymer with 1 part by weight R2 polymer, resulting in 50 wt % R1 polymer/50 wt % R2 polymer).

TABLE 1.3

Characterization of Example 1 Polymer Blend Pellets

| Parameter | Sample 1 | Sample 2 |
|---|---|---|
| C2 (wt %) | 56.1 | 56.1 |
| ENB (wt %) | 4.7 | 4.9 |
| Mooney Viscosity (ML, 1 + 4 @ 125° C.) | 68.0 | 84.4 |
| Mooney Relaxation Area (MLRA) | 410.8 | 522.5 |

Example 2

In Table 2.1 below, characteristics of the Sample 1 and 2 blends are compared with characteristics of two commercial comparators: Vistalon™ 6602 EPDM rubber (V6602 in Table 2.1), a metallocene-catalyzed EPDM rubber and Vistalon™ 7500 EPDM rubber (V7500 in Table 2.1), a Ziegler-Natta catalyzed EPDM rubber made using a conventional vanadium catalyst and aluminum alkyl co-catalyst, and having extensive long-chain branching. Both are available from ExxonMobil Chemical Company (Houston, Tex.).

TABLE 2.1

Characterization of Example 2 Polymer Blend Pellets

| Polymer | Mooney Viscosity (MU (ML, 1 + 4@125° C.)) | cMLRA at 80 MU (ML, 1 + 4@125° C.) | Ethylene content (wt %) | ENB content (wt %) |
|---|---|---|---|---|
| Sample 1 | 68.0 | 519.2 | 56.1 | 4.7 |
| Sample 2 | 84.4 | 483.7 | 56.1 | 4.9 |
| V6602 | 84 | 276 | 52 | 5.2 |
| V7500 | 88 | 776 | 53 | 5.7 |

As would be expected, the Ziegler-Natta catalyzed V7500 material with long-chain branching exhibits a substantially higher cMLRA than does the metallocene-catalyzed V6602 material. On the other hand, the metallocene-catalyzed Sample 1 and Sample 2 exhibit much higher cMLRA than the metallocene-catalyzed V6602 with similar ethylene and ENB content, and further with similar Mooney viscosity to the Sample 2 metallocene-catalyzed EPDM. This indicates an advantageously greater degree of long-chain branching in the metallocene-catalyzed Sample 1 and Sample 2 polymer blends, as compared to the metallocene-catalyzed V6602 EPDM. While Sample 1 and Sample 2 do not have cMLRA as high as the Ziegler-Natta catalyzed V7500 EPDM, they represent substantial progress for metallocene-catalyzed EPDM rubbers.

Example 3

Representative EPDM compound formulations containing polymer (Sample 1, Sample 2, or V7500), carbon black, oil and curatives were prepared in a 410 cc Banbury® Mixer in order to compare the new metallocene-catalyzed EPDM polymer blends with the non-metallocene long-chain branched V7500 EPDM rubber.

Table 3.1 shows the representative EPDM formulation. A conventional mix was adopted for compounding using a fill factor of 70%. At the start of the mix, the chamber was filled with polymer. Carbon black, oil, zinc oxide and stearic acid were added gradually to the mixer while mixing speed was maintained at 60 rpm. After the mix had homogenized, the mixing speed was reduced to control the temperature. Mixing was continued for 3 minutes, after which the resulting masterbatch was discharged from the Banbury mixer. About 15 seconds prior to the end of mixing, the ram was raised to rotate the batch. The temperature of the discharged masterbatch on average was about 300° F. (~149° C.), and the discharge weight about 334 g.

In addition, the curatives (sulfur, ZBEC, MBTS, Rhenocure™ ZADT/G and Rhenocure™ TP/G) were added to the discharged masterbatch on a two roll mill. The batch was passed several times through the mill to ensure a homogeneous dispersion of the curatives. Prior to cure, a 5 g sample of each compound was isolated for rheology measurements (which tests were conducted at 100° C. so as to avoid curing the compounds). The batches containing the curatives were then cured in an electric press and isolated and tested for various other physical and mechanical properties.

TABLE 3.1

Example 3 Representative EPDM Formulation and Mixing (410 cc Mixer)

| | |
|---|---|
| Polymer (Sample 1, 2, or V7500) | 100 |
| Carbon Black N550 | 130.0 |
| Sunpar™ 2280 | 70.0 |
| Zinc Oxide | 5.0 |
| Stearic Acid | 1.0 |
| Sulphur | 0.1 |
| Mill Addition Entire Batch | |
| Sulfur | 1.1 |
| ZBEC (70% active) | 1.5 |
| MBTS (80%) | 1.5 |
| Rhenocure ™ ZADT/G (50% ACTIVE) | 1.5 |
| Rhenocure ™ TP/G (50% ACTIVE) | 1.8 |
| Specific Gravity | 1.142 g/cm³ |
| Total PHR master batch | 306.0 |
| Total PHR compound | 314 |
| Batch Factor | 1.05 |
| Fill (%) | 70 |
| Batch wt. (gm) | 328 |

*Unless otherwise noted, all values are in phr (parts per hundred parts resin), based on the addition of 100 parts polymer as indicated.

In Table 3.1, Carbon Black N550 is carbon black (Continex™ N550 from Continental Carbon Company). Sunpar™ 2280 is a paraffinic processing oil (available from HollyFrontier); Zinc Oxide is Zinc Oxide; ZBEC is zinc di-benzyl dithiocarbamate; MBTS is 2-mercaptobenzothiazole disulfide; Rhenocure™ ZADT/G is zinc amine dithiophosphate (50% active ingredient), commercially available from RheinChemie; Rhenocure™ TP/G is zinc dialkyl dithiophosphate containing 50% active ingredient, commercially available from RheinChemie. Batch Factor is a sizing factor useful in converting the above recipe (in phr) to weight of ingredients for use in compounding. Specifically, the phr of each ingredient is multiplied by the batch factor to provide the weight of that ingredient to be used in the compounding.

Table 3.2 illustrates the compound rheology properties of the compounds made according to the representative formulation of Table 3.1 (with each of the polymer Samples 1, 2, and V7500).

TABLE 3.2

Compound Rheology Properties of Example 3 Samples

| Property | Units | V7500 | Sample 1 | Sample 2 |
|---|---|---|---|---|
| Compound Viscosity (ML, 1 + 4 @ 100° C.) | MU | 77 | 81 | 92 |
| Polymer ML | MU | 91 | 68.0 | 84.4 |
| Compound Mooney Ratio | | 0.8462 | 1.1911 | 1.0900 |
| *Compound SAOS 100° C., 14% strain* | | | | |
| Tan Delta @ 0.245 Rad/s | | 0.683 | 0.780 | 0.750 |
| Viscosity @ 0.245 Rad/s | Pa · sec | $4.26 \times 10^5$ | $4.56 \times 10^5$ | $5.34 \times 10^5$ |
| Power Law - A0 | Pa · sec | $1.49 \times 10^5$ | $1.58 \times 10^5$ | $1.82 \times 10^5$ |
| Power Law Index - A1 | | −0.740 | −0.743 | −0.760 |
| *Mooney Scorch at 125° C.* | | | | |
| Min Viscosity | MU | 30 | 32 | 38 |
| t10 − t5 | min | 1.6 | 1.8 | 1.5 |
| t5 − t1 | min | 3.1 | 3.3 | 2.8 |
| Ms t1 | min | 6.7 | 7.1 | 6.5 |
| Ms t5 | min | 9.9 | 10.5 | 9.3 |
| Ms t10 | min | 11.5 | 12.2 | 10.8 |
| *Oscillating disc rheometer (ODR) 180° C. +/− 3° Arc* | | | | |
| ML | dN · m | 10 | 10 | 13 |
| MH | dN · m | 62 | 77 | 72 |
| ts2 | min | 1.2 | 0.9 | 0.9 |
| t25 | min | 1.8 | 1.4 | 1.3 |
| t50 | min | 2.7 | 1.9 | 1.7 |
| t90 | min | 6.5 | 6.1 | 4.6 |
| Peak Rate | dN · m/min | 48.8 | 46.2 | 44.9 |
| MH − ML | dN · m | 52 | 67 | 59 |
| *Press Cure, (1.4* t90 min)/Median of 3 pulls* | | | | |
| Press cure time at 180° C. | Min | 9 | 8 | 6 |
| Hardness | Shore A | 70 | 69 | 68 |
| 100% modulus | MPa | 4.6 | 4.0 | 4.2 |
| Stress @ break | MPa | 10.5 | 11.4 | 12.1 |

TABLE 3.2-continued

Compound Rheology Properties of Example 3 Samples

| | Units | V7500 | Sample 1 | Sample 2 |
|---|---|---|---|---|
| Strain @ break | % | 248 | 351 | 358 |
| Tear – Die C (avg. Peak Value) | N/mm | 31.9 | 39.6 | 36.8 |
| Compound Green Tear Strength | | | | |
| Die C: Max Value | N/mm | 5.1 | 4.5 | 4.6 |
| Compression Set (press cure 180° C. @ tc90 * 1.4 * 1.5 min) | | | | |
| Press cure time at 180° C. | min | 14 | 13 | 10 |
| 168 h, 70° C., 25% deflection | % | 23 | 27 | 28 |

Mooney Scorch as set forth in Table 3.2 is essentially a measurement of the rate at which a rubber compound will cure or set up in a Mooney test. For example, t1 implies how long it takes for the compound to increase in viscosity by 1 Mooney Unit from the minimum value; t5 implies time for 5 MU increase, and so on. The faster a compound cures, the lower its Mooney Scorch times.

Mooney Viscosity was determined for both (i) polymer alone and (ii) each compound made using the polymers in order to determine Compound Mooney Ratio for each polymer. The Compound Mooney Ratio is defined as the ratio of compound Mooney Viscosity (ML, 1+4, 100° C.) to the polymer Mooney Viscosity (ML, 1+4, 125° C.). As noted, measurement of the compound Mooney took place at lower temperature to avoid inadvertent curing reactions. A lower Compound Mooney Ratio is indicative of increased branching in the polymer. Furthermore, lower Compound Mooney Ratio indicates advantageous processability. That is, for a polymer of given Mooney Viscosity, the lower that polymer's Compound Mooney Ratio, the easier it is to process similar formulations made from that polymer. Here, the Sample 1 and Sample 2 polymers' Compound Mooney Ratios are acceptably low to demonstrate ease of processing. More importantly, the ultimate compound viscosities made from Sample 1 and Sample 2 (81 and 92 MU (ML, 1+4 @ 100° C.), respectively) are well within the acceptable range for processability. It is highly advantageous to be able to achieve such compound Mooney viscosity measurements with metallocene-catalyzed polymers.

Example 4

Additional representative EPDM compound formulations containing polymer (Sample 5, Sample 6, V6602, or V7500), carbon black, oil and curatives were prepared in a larger 1570 cc Banbury® Mixer in order to compare the new metallocene-catalyzed EPDM polymer blends with the non-metallocene long-chain branched V7500 EPDM rubber and with the metallocene-catalyzed V6602 EPDM rubber. Sample 5 was taken from the same batch of polymers as Sample 1 (i.e., it had the same properties), and Sample 6 was taken from the same batch of polymers as Sample 2.

Table 4.1 shows the representative EPDM formulations and mixing preparation used in Example 4. In making compound samples from these formulations, an upside-down mix was adopted for compounding using a fill factor of 70%. At the start of the mix, one half of the carbon black and oil were first introduced, after which the other half of the carbon black and additives were added into the mixer. Polymer was added at 30 seconds, and about 2.5 minute into the mix cycle, the ram was raised in order to turn the batch. The batch was discharged at 4 minutes from start of the mix cycle. Average batch discharge temperature was 146° C. Rotor speed, mixing energy and batch discharge weight are set forth in Table 4.1.

In addition, as with Example 3 compound mixing, the curatives (sulfur, ZBEC, MBTS, Rhenocure™ ZADT/G and Rhenocure™ TP/G) were added to the discharged masterbatch on a two roll mill. Mill temperature was maintained at 50° C. and total milling time was 4.5 minutes. The batch was passed several times through the mill to ensure a homogeneous dispersion of the curatives. Prior to cure, a 5 g sample of each compound was isolated for rheology measurements (which tests were conducted at 100° C. so as to avoid curing the compounds). The batches containing the curatives were then cured in an electric press and isolated and tested for various other physical and mechanical properties.

TABLE 4.1

Example 4 Representative EPDM Formulation and Mixing (1570 cc Mixer)

| | |
|---|---|
| Polymer (Sample 5, 6, V7500, or V6602) | 100 |
| Carbon Black N550 | 130.0 |
| Sunpar ™ 2280 | 70.0 |
| Zinc Oxide | 5.0 |
| Stearic Acid | 1.0 |
| Sulfur | 0.05 |
| CaCO$_3$ | 25.0 |
| Mill Addition Entire Batch | |
| Sulfur | 1.15 |
| ZBEC (70% active) | 1.05 |
| MBTS (80%) | 1.20 |

TABLE 4.1-continued

| Example 4 Representative EPDM Formulation and Mixing (1570 cc Mixer) | |
|---|---|
| Rhenocure ™ ZADT/G (50% ACTIVE) | 1.10 |
| Rhenocure ™ TP/G (50% ACTIVE) | 1.80 |
| Specific Gravity | 1.192 g/cm$^3$ |
| Total PHR master batch | 306.0 |
| Total PHR compound | 337.35 |
| Batch Factor | 3.88 |
| Fill (%) | 70 |
| Batch wt. (gm) | 1310 |
| Mixing cycle: Master batch | |
| Time | Addition Order |
| 0:00 | ½ carbon + oil + ½ carbon + other chemicals |
| 0:30 | Polymer |
| 2:30 | RAM sweep |
| 4:00 | Dump@ 140-150° C. |
| Start Temp (° C.) | 53 |
| Dump Temp (° C.) | 146 |
| Mixing time (min:sec) | 4:00 |
| Energy (W − h) | 366 |
| Rotor Speed (rpm) | 70 |
| Theoretical weight (g) | 1404 |
| Actual weight (g) | 1404 |
| Final Mixing (two roll Mill) | |
| Start temp (° C.) | 50 |
| Mixing time (min:sec) | 4:30 |

Table 4.2 shows the compound properties. Example 5 matches the compound Mooney Viscosity of the control V7500 compound.

TABLE 4.2

Compound Rheology Properties of Example 4 Samples

| | Units | V7500 | Sample 5 | Sample 6 | V6602 |
|---|---|---|---|---|---|
| Property | | | | | |
| Compound Viscosity (ML, 1 + 4 @ 100° C.) | MU | 76 | 76 | 90 | 93 |
| Polymer ML | MU | 88 | 68 | 84.4 | 84 |
| Polymer MLRA | MU-sec | 896 | 355 | 508 | 298 |
| Compound Mooney Ratio | | 0.864 | 1.118 | 1.066 | 1.107 |
| Mooney Scorch at 125° C. | | | | | |
| Min Viscosity | MU | 5.3 | 5.3 | 4.9 | 5.2 |
| t10 − t5 | min | 1.3 | 1.3 | 1.3 | 1.3 |
| t5 − t1 | min | 2.3 | 2.3 | 2.2 | 2.0 |
| Ms t1 | min | 6.7 | 6.55 | 6.35 | 6.3 |
| Ms t5 | min | 8.98 | 8.82 | 8.5 | 8.3 |
| Ms t10 | min | 10.23 | 10.13 | 9.75 | 9.6 |
| Rheometer Curve with moving die rheometer (MDR) @ 180° C. | | | | | |
| ML | dN · m | 2.0 | 2.0 | 2.4 | 2.4 |
| MH | dN · m | 19.9 | 19.4 | 20.3 | 22.1 |
| ts2 | min | 0.6 | 0.6 | 0.6 | 0.6 |
| t25 | min | 0.7 | 0.7 | 0.7 | 0.7 |
| t50 | min | 1.0 | 1.1 | 1.0 | 0.9 |
| t90 | min | 3.2 | 3.5 | 3.4 | 3.1 |
| t95 | | 4.1 | 4.5 | 4.4 | 4.0 |
| Cure rate - calc[1] | dN · m/min | 3.8 | 3.3 | 3.5 | 4.3 |
| MH-ML | dN · m | 17.9 | 17.4 | 18.0 | 19.7 |
| Press Cure, (180° C. for 8 min) | | | | | |
| Hardness | Shore A | 70 | 69 | 70 | 71 |
| 100% modulus | MPa | 4.5 | 4.4 | 4.2 | 4.3 |
| 200% modulus | MPa | 8.8 | 8.4 | 8.5 | 8.4 |
| 300% modulus | MPa | 6.9 | 9.8 | 11.9 | 11.3 |

TABLE 4.2-continued

Compound Rheology Properties of Example 4 Samples

|  | Units | V7500 | Sample 5 | Sample 6 | V6602 |
|---|---|---|---|---|---|
| Stress @ break | MPa | 12.1 | 11.6 | 12.5 | 11.9 |
| Strain @ break | % | 290 | 300 | 320 | 330 |
| Energy @ break[2] | J | 5.9 | 6.0 | 6.9 | 6.6 |
| Tear - Die C (avg. Peak Value) | N/mm | 26.9 | 28.4 | 28.0 | 28.7 |
| Compound Green Tear Strength | | | | | |
| Die C: Max Value | N/mm | 3.9 | 2.9 | 3.1 | 3.1 |
| Compression Set (press cure 180° C. for 10 min) | | | | | |
| 168 h, 70° C. 25% deflection | % | 14 | 17 | 16 | 15 |
| Extrusion Data | | | | | |
| Rating System A (ASTM D2230) | | | | | |
| 30° edge | | 4.0 | 4.0 | 4.0 | 4.0 |
| surface | | 4.0 | 4.0 | 4.0 | 4.0 |
| Swell | | 4.0 | 4.0 | 4.0 | 4.0 |
| Corners | | 4.0 | 4.0 | 4.0 | 4.0 |
| Total | | 16.0 | 16.0 | 16.0 | 16.0 |
| Rating System B (ASTM D2230) | | A10 | A10 | A10 | A10 |
| Extrusion Rate | g/min | 25.9 | 26.4 | 28.5 | 26.1 |
| Extrusion Rate | Cm/min | 37.2 | 37.8 | 38.9 | 36.9 |
| Shrinkage % | % | 2.2 | 2.8 | 2.0 | 1.7 |

[1]Cure rate is calculated from the slope of the cure curve (torque vs. time) developed from the MDR measurement.
[2]Energy @ break is the total area under the stress-strain curve.

Extrusion data ratings were carried out in accordance with ASTM D2230 (both rating system A and B, as indicated in Table 4.2).

Furthermore, the Example 4 compounds were tested for SAOS properties in accordance with the Test Methods described above. FIG. 1 illustrates the tan(δ) of the Sample 5, 6, V7500 and V6602 compounds. Lower tan(δ) values are desirable as they are indicative of higher melt elasticity and consequently greater dimensional stability of the article after extrusion and prior to continuous vulcanization. As shown in FIG. 1, the compound containing metallocene-catalyzed Sample 6 polymer surprisingly and advantageously matches the tan(δ) of the Vanadium-catalyzed V7500 compound.

Figure 2:
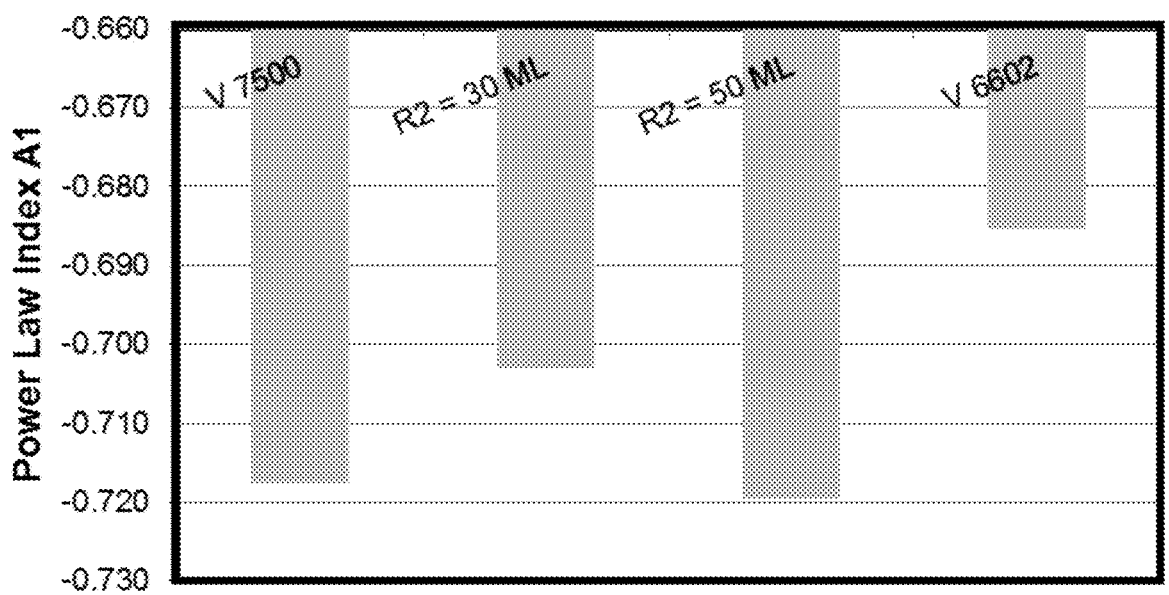
FIG. 2 is a graph showing Power Law Index A1 values of various compounds in accordance with Example 4.

FIG. 2 illustrates the Power Law Index A1 for each of the Example 4 compounds. The index, as described previously in the Test Methods section, is calculated from the curve fit of the compound complex viscosity with frequency. The absolute value of the power law index represents a degree of shear sensitivity of the compound. Higher absolute value denotes a higher level of shear thinning that will lead to advantageously lower viscosity at high shear rates, indicating, among other things, superior processability. From FIG. 2, it can be seen the inventive compounds made with Samples 5 and 6 polymers are much more shear sensitive than compounds made with the metallocene V6602, and have similar shear sensitivity to the Vanadium-catalyzed V7500 compound. In fact, compounds made from the Sample 6 polymer are even more shear sensitive than compounds made with the V7500 compound.

Figure 3:
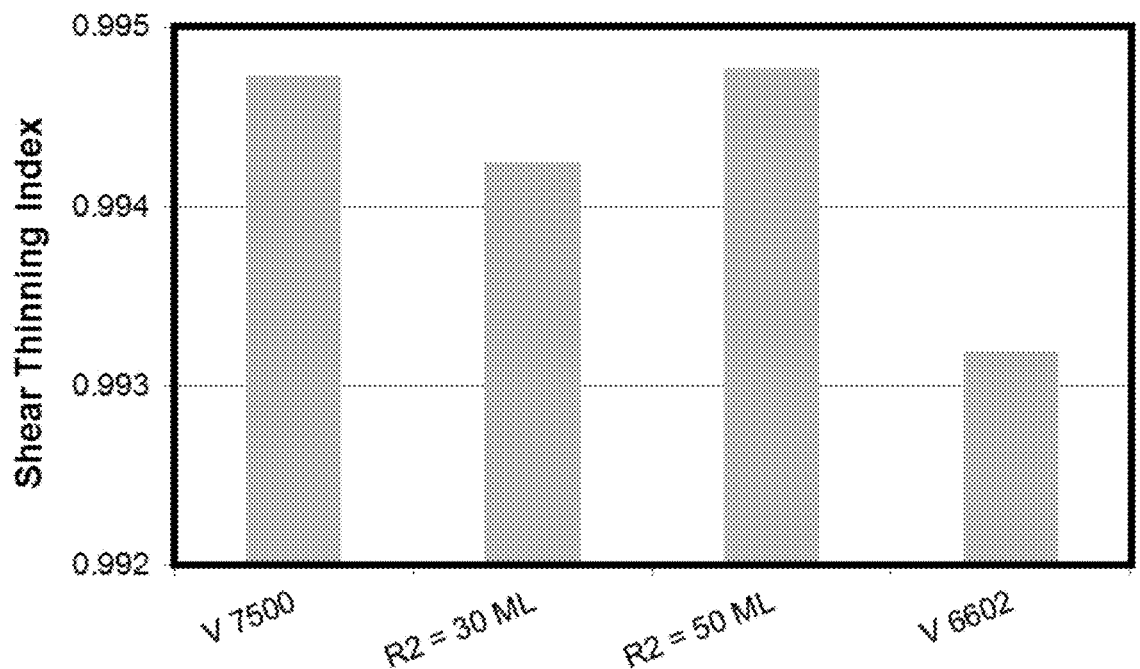
FIG. 3 is a graph showing shear thinning index (STI) of various compounds in accordance with Example 4.

FIG. 3 is a plot of shear thinning index (STI) for the Example 4 compounds, calculated as described above in the Test Methods section. A higher shear thinning index is also indicative of greater shear sensitivity, and the same trends as in FIG. 2 can be seen.

Figure 4:
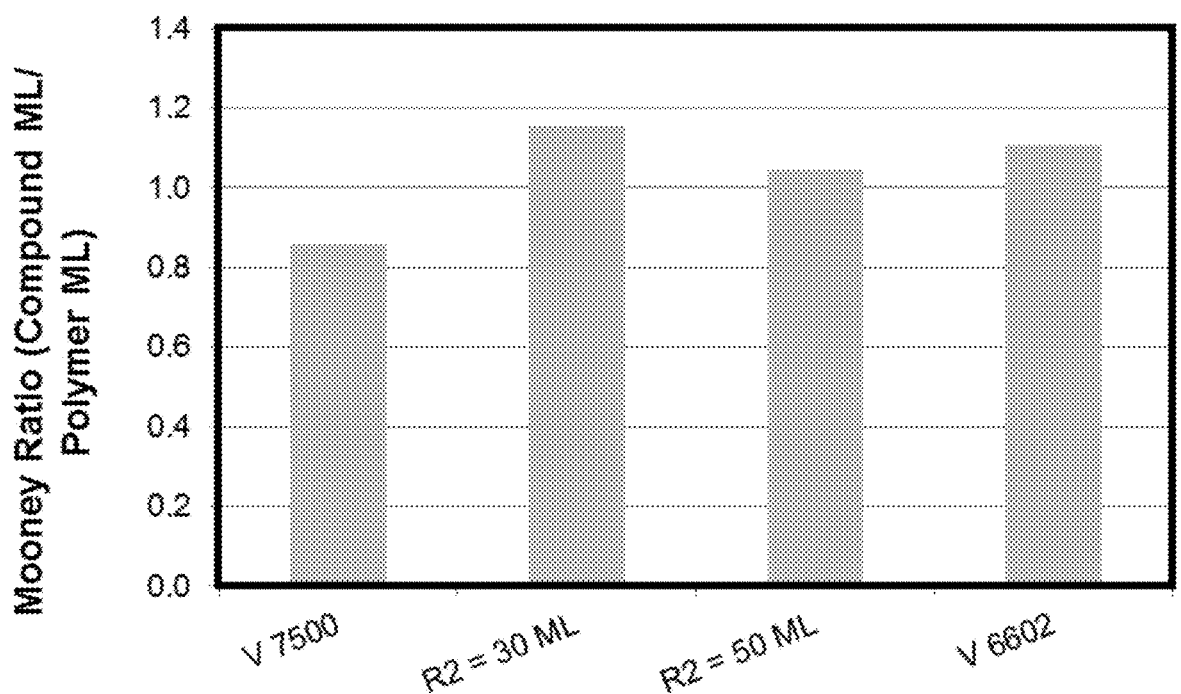
FIG. 4 is a graph showing Compound Mooney Ratio of various compounds in accordance with Example 4.

FIG. 4 shows a plot of the Compound Mooney Ratio for the various Example 4 compounds. As noted previously, a lower ratio is desirable as it, among other things, indicates desirable balance of processability and physical properties. Although Compound Mooney Ratios are desirably low among all samples tested, it is noted that the Sample 5 compound is very similar to the V6602 in this respect, while the Sample 6 compound is superior. Regardless, both Sample 5 and Sample 6 provide acceptably low Compound Mooney Ratios and, more importantly, acceptably low ultimate compound viscosities (76 and 90 MU (ML, 1+4 @100° C.), respectively) for good processability, notwithstanding that they are metallocene-catalyzed.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" to require the listed components without excluding the presence of any other additional components. Likewise whenever a composition, an element or a group of elements is preceded with the transitional phrase "comprising", it is understood that we also contemplate the same composition or group of elements further narrowed with more restrictive transitional phrases such as "consisting essentially of", "consisting of", "selected from the group of consisting of", or "is" preceding the recitation of the composition, element, or elements and vice versa.

The invention claimed is:

1. An ethylene copolymer composition comprising a copolymer blend of: an ethylene copolymer fraction (A) having Mooney Viscosity within the range from 14 to 40 MU (MST, 5+4 @ 200° C.) and corrected Mooney Small-Thin Relaxation Area (cMSTRA, normalized to 50 MU (MST, 5+4 @ 200° C.) reference) of at least 600 MU-sec, wherein the ethylene copolymer fraction (A) comprises 30 to 80 wt % ethylene-derived units, units derived from one or more C3 to C20 α-olefins, and 0 to 10 wt % polyene-derived units, said wt % s based on the weight of the ethylene copolymer fraction (A); and a linear ethylene copolymer fraction (B) having Mooney Viscosity within the range from 5 to 100 MU (ML, 1+4 @ 125° C.) and corrected Mooney Large Relaxation Area (cMLRA, normalized to 80 MU (ML, 1+4 @ 125° C.) reference) within the range from 15 to 350 MU-sec, wherein the linear ethylene copolymer fraction (B) comprises 30 to 80 wt % ethylene-derived units, units derived from one or more C3 to C20 α-olefins, and 0 to 10 wt % polyene-derived units, said wt % s based on the weight of the ethylene copolymer fraction (B).

2. The composition of claim 1, wherein the copolymer blend has Mooney Viscosity within the range from 30 to 100 MU (ML, 1+4 @ 125° C.) and cMLRA within the range from 300 to 800 MU-sec.

3. The composition of claim 2, wherein the linear ethylene copolymer fraction (B) has Mooney Viscosity within the range of 40 to 60 MU and cMLRA within the range from 115 to 250 MU-sec, and further wherein the blend has Mooney Viscosity within the range from 75 to 100 MU (ML, 1+4 @ 125° C.) and cMLRA within the range from 450 to 800 MU-sec.

4. The composition of claim 2, wherein the linear ethylene copolymer fraction (B) has Mooney Viscosity within the range from 5 to 40 MU and cMLRA within the range from 75 to 115 MU-sec, and further wherein the blend has Mooney Viscosity within the range from 50 to 80 MU (ML, 1+4 @ 125° C.) and cMLRA within the range from 300 to 500 MU-sec.

5. The composition of claim 1, wherein the ethylene copolymer fraction (A) is branched and bimodal.

6. The composition of claim 1, wherein each of the ethylene copolymer fraction (A) and the linear ethylene copolymer fraction (B) independently comprises 40 to 80 wt % ethylene-derived units, units derived from propylene, and 2 to 8 wt % diene-derived units.

7. The composition of claim 6, wherein the diene of the ethylene copolymer fraction (A) and the diene of the linear ethylene copolymer fraction (B) each comprise 5-ethyl-idene-2-norbornene (ENB).

8. The composition of claim 1, wherein the ethylene copolymer fraction (A) is produced by polymerizing monomers comprising (i) ethylene; (ii) a C3 C20 α-olefin monomer; and optionally (iii) one or more dienes in the presence of a dual metallocene catalyst system comprising both a first metallocene catalyst and a second metallocene catalyst in a first polymerization reaction zone;

wherein the first metallocene catalyst, prior to activation, has structure in accordance with Formula (I):

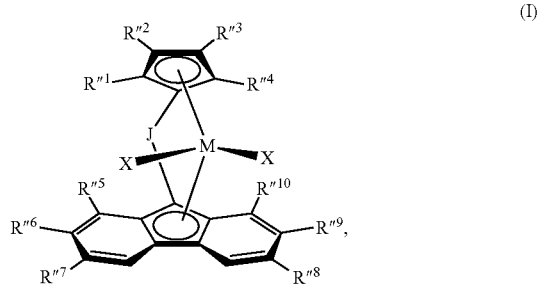

(I)

where (1) J is a divalent bridging group comprising C, Si, or both; (2) M is a group 4 transition metal; (3) each X is independently a univalent anionic ligand, or two Xs are joined and bound to the metal atom to form a metallocycle ring, or two Xs are joined to form a chelating ligand, a diene ligand, or an alkylidene ligand; and (4) each R"1 R"10 is independently hydrogen, C1-C50 hydrocarbyl, substituted hydrocarbyl, halocarbyl, or substituted halocarbyl;

wherein the second metallocene catalyst, prior to activation, has structure in accordance with Formula (II):

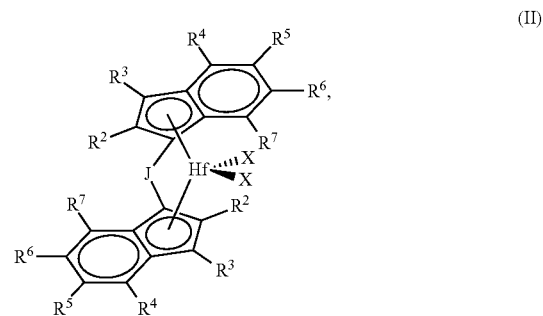

(II)

where: (1) J is a divalent bridging group comprising C, Si, or both; (2) M is Hf; (3) each X is independently a univalent anionic ligand, or two Xs are joined and bound to the metal atom to form a metallocycle ring, or two Xs are joined to form a chelating ligand, a diene ligand, or an alkylidene ligand; and (4) each R2-R7 is independently hydrogen, C1-C50 substituted or unsubstituted hydrocarbyl, or C1-050 substituted or unsubstituted halocarbyl;

wherein the first and second metallocene catalysts of the dual metallocene catalyst system are activated by a first non-coordinating anion (NCA) activator.

9. The composition of claim 8, wherein the linear ethylene copolymer fraction (B) is produced by polymerizing, in a second polymerization reaction zone, monomers comprising (i) ethylene; (ii) a C3-C20 α-olefin monomer; and optionally (iii) one or more dienes in the presence of a high-Mooney-producing ("HMP") catalyst having structure, prior to activation, in accordance with Formula (I), and further wherein the catalyst is activated by a second NCA activator that is the same as or different from the first NCA activator.

10. The composition of claim 9, wherein the first metallocene catalyst comprises 1,1'-bis(4-triethylsilylphenyl)methylene-(cyclopentadienyl)(2,7-di-tertiary-butyl-fluoren-9-yl)hafnium dimethyl activated by the first NCA activator; the second metallocene catalyst comprises cyclotetramethylenesilylene-bis(4,7-dimethylinden-1-yl)hafnium dimethyl activated by the first NCA activator; and the HMP catalyst comprises 1,1'-bis(4-triethylsilylphenyl)methylene-(cyclopentadienyl)(2,7-di-tertiary-butyl-fluoren-9-yl)hafnium dimethyl activated by the second NCA activator.

11. The composition of claim 9, wherein the first polymerization reaction zone and the second polymerization reaction zone are arranged in a parallel polymerization configuration, such that effluent from the first polymerization zone is combined with effluent from the second polymerization zone to form a combined effluent, from which the copolymer blend is recovered.

12. An at least partially cross-linked rubber compound made by mixing a formulation comprising:
   (a) a composition according to claim 1;
   (b) one or more vulcanization activators; and
   (c) one or more vulcanizing agents.

13. The compound of claim 12, wherein the compound further comprises a paraffinic process oil present in the formulation between 1 and 150 phr, said paraffinic process oil having a viscosity at 40° C. within the range from 80 to 600 CSt.

14. The compound of claim 12, wherein the mixing comprises mixing in one of an open mill, an internal mixer, and an extruder.

15. The compound of claim 12, wherein the compound has Mooney Viscosity within the range from 70 to 95 MU (ML, 1+4 @ 100° C.).

16. The compound of claim 12, wherein the compound and copolymer blend are such that the Compound Mooney Ratio is within the range from 0.9 to 1.15.

17. The compound of claim 12, wherein the compound exhibits one or more of the following properties:
   (i) tan(δ) less than 0.80;
   (ii) STI greater than 0.9930; and
   (iii) absolute value of power law index A1 within the range from 0.685 to 0.750.

18. The compound of claim 17, exhibiting all of the properties (i)-(iii).

19. A process comprising:
   (a) polymerizing (i) ethylene; (ii) one or more C3 to C20 α-olefin monomers; and optionally (iii) one or more polyenes in the presence of a dual metallocene catalyst system in a first polymerization reaction zone so as to obtain a first polymerization effluent comprising a branched and/or bimodal ethylene copolymer composition (A);
   (b) polymerizing (i) ethylene; (ii) one or more C3 to C20 α-olefin monomers; and optionally (iii) one or more polyenes in the presence of a high-Mooney-producing ("HMP") catalyst in a second polymerization reaction zone so as to obtain a second polymerization effluent comprising a linear ethylene copolymer composition (B);
   (c) combining the first and second polymerization effluents to form a combined effluent; and
   (d) recovering from the combined effluent a solid copolymer blend comprising 30 to 80 wt % ethylene, units derived from one or more C3 to C20 α-olefin monomers, and 0 to 10 wt % units derived from one or more polyenes;
   wherein the copolymer blend has Mooney Viscosity within the range from 30 to 100 MU (ML, 1+4 @ 125° C.) and cMLRA within the range from 300 to 800 MU-sec.

20. The process of claim 19, wherein the dual metallocene catalyst system comprises a first metallocene catalyst and a second metallocene catalyst activated by a first NCA activator;
   wherein the first metallocene catalyst, prior to activation, has structure in accordance with Formula (I):

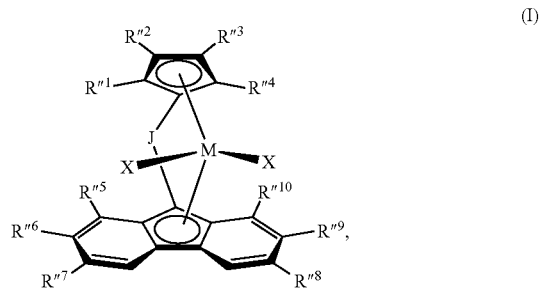

where (1) J is a divalent bridging group comprising C, Si, or both; (2) M is a group 4 transition metal; (3) each X is independently a univalent anionic ligand, or two Xs are joined and bound to the metal atom to form a metallocycle ring, or two Xs are joined to form a chelating ligand, a diene ligand, or an alkylidene ligand; and (4) each R"1-R"10 is independently hydrogen, C1-C50 hydrocarbyl, substituted hydrocarbyl, halocarbyl, or substituted halocarbyl;

and wherein the second metallocene catalyst, prior to activation, has structure in accordance with Formula (II):

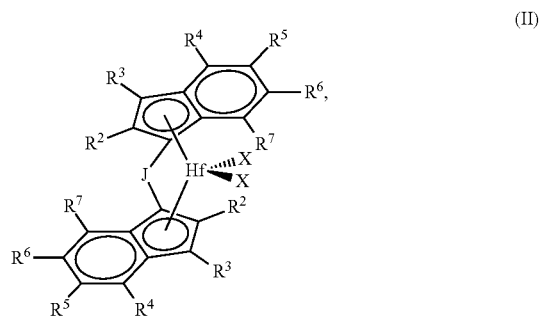

where: (1) J is a divalent bridging group comprising C, Si, or both; (2) M is Hf; (3) each X is independently a univalent anionic ligand, or two Xs are joined and bound to the metal atom to form a metallocycle ring, or two Xs are joined to form a chelating ligand, a diene ligand, or an alkylidene ligand; and (4) each R2-R7 is independently hydrogen, C1-050 substituted or unsubstituted hydrocarbyl, or C1-050 substituted or unsubstituted halocarbyl.

21. The process of claim 20, wherein the HMP catalyst has structure in accordance with Formula (I), prior to activation; and further wherein the HMP catalyst is activated by a second NCA activator.

22. The process of claim 21, wherein the first NCA activator comprises N,N dimethylanilinium tetrakis(heptafluoro-2-naphthyl)borate; and the second NCA activator comprises N,N-dimethylanilinium tetrakis(pentafluorophenyl)borate.

23. The process of claim 19, wherein the polymerizing (a) and polymerizing (b) are solution polymerizations, such that the first and second polymerization effluents each further comprise polymerization solvent; and further wherein the combining (c) comprises combining the first and second polymerization effluents while said effluents are still in solution; and the recovering (d) comprises any one or more of flash separations, liquid-liquid phase separations, and devolatilization.

24. The process of claim 19, wherein:

the branched and/or bimodal copolymer composition (A) has Mooney Viscosity within the range from 14 to 40 MU (MST, 5+4 @ 200° C.) and corrected Mooney Small-Thin Relaxation Area (cMSTRA, normalized to a 50 MU (MST, 5+4 @ 200° C.) reference) of at least 600 MU-sec, and further wherein the branched and/or bimodal copolymer composition (A) comprises 30 to 80 wt % ethylene-derived units, units derived from one or more C3 to C20 α-olefins, and 0 to 10 wt % polyene-derived units, said wt % s based on the weight of the ethylene copolymer composition (A); and further wherein the linear copolymer composition (B) has Mooney Viscosity within the range from 5 to 100 MU (ML, 1+4 @ 125° C.) and corrected Mooney Large Relaxation Area (cMLRA, normalized to an 80 MU (ML, 1+4 @ 125° C.) reference) within the range from 15 to 350 MU-sec, and further wherein the linear ethylene copolymer fraction (B) comprises 30 to 80 wt % ethylene-derived units, units derived from one or more C3 to C20 α-olefins, and 0 to 10 wt % polyene-derived units, said wt % s based on the weight of the ethylene copolymer fraction (B).

25. The process of claim 19, wherein the solid copolymer blend exhibits one or more of the following properties:

(iv) tan(δ) less than 0.80;

(v) STI greater than 0.9930; and (vi) absolute value of power law index A1 within the range from 0.685 to 0.750.

\* \* \* \* \*